US008824864B2

(12) United States Patent
Yahata et al.

(10) Patent No.: US 8,824,864 B2
(45) Date of Patent: Sep. 2, 2014

(54) DATA PROCESSOR

(75) Inventors: Hiroshi Yahata, Osaka (JP); Tomoyuki Okada, Nara (JP); Masanori Itoh, Osaka (JP)

(73) Assignee: Panasonic Corporation, Osaka (JP)

( * ) Notice: Subject to any disclaimer, the term of this patent is extended or adjusted under 35 U.S.C. 154(b) by 163 days.

(21) Appl. No.: 13/217,490

(22) Filed: Aug. 25, 2011

(65) Prior Publication Data

US 2011/0305125 A1 Dec. 15, 2011

Related U.S. Application Data

(63) Continuation of application No. 11/575,408, filed as application No. PCT/JP2005/017029 on Sep. 15, 2005, now Pat. No. 8,032,012.

(30) Foreign Application Priority Data

Sep. 24, 2004 (JP) .................................. 2004-277594
Nov. 10, 2004 (JP) .................................. 2004-326351

(51) Int. Cl.
*H04N 5/93* (2006.01)
*H04N 7/50* (2006.01)
*G11B 27/32* (2006.01)
*H04N 7/26* (2006.01)
*G11B 27/034* (2006.01)
*H04N 5/781* (2006.01)
*H04N 5/91* (2006.01)
*H04N 5/77* (2006.01)

(52) U.S. Cl.
CPC ... *H04N 19/00884* (2013.01); *H04N 19/00781* (2013.01); *G11B 27/322* (2013.01); *H04N 19/00545* (2013.01); *H04N 5/781* (2013.01); *G11B 2220/412* (2013.01); *H04N 19/00127* (2013.01); *H04N 5/91* (2013.01); *H04N 5/77* (2013.01); *G11B 2220/2516* (2013.01); *H04N 19/00472* (2013.01); *G11B 27/034* (2013.01); *G11B 2220/41* (2013.01); *H04N 19/00266* (2013.01)
USPC .......................................... 386/283; 386/278

(58) Field of Classification Search
CPC ........................... G11B 27/34; H04N 19/00884
USPC ......... 386/239, 241, 248, 278, 282, 283, 326, 386/330, 338, 389
See application file for complete search history.

(56) References Cited

U.S. PATENT DOCUMENTS 6,078,727 A 6/2000 Saeki et al.
6,148,140 A * 11/2000 Okada et al. .................. 386/241

(Continued)

FOREIGN PATENT DOCUMENTS

EP 1 089 571 A2 4/2001
EP 1 126 454 A1 8/2001

(Continued)

OTHER PUBLICATIONS

Co-Pending U.S. Application filed Aug. 25, 2011 (application provided).

(Continued)

Primary Examiner — Hung Dang
Assistant Examiner — Mishawn Dunn
(74) Attorney, Agent, or Firm — Renner, Otto, Boisselle & Sklar, LLP

(57) ABSTRACT

To provide means for editing a content data stream quickly. A data processor according to the present invention can edit a content that has been written on a medium. The content is stored in a file as a data stream including multiple packets of the same packet size. And a file system for accessing data on a cluster size basis has been established on the medium. The data processor includes: a receiving section, which receives an instruction on a partial deletion range including the beginning of the file; and a media control section for deleting data, the size of which is an integral number of times as large as the least common multiple of the cluster size and the packet size, from the beginning of the file within the partial deletion range.

6 Claims, 17 Drawing Sheets

(56) References Cited

U.S. PATENT DOCUMENTS

| | | |
|---|---|---|
| 2003/0185116 A1 | 10/2003 | Ohbi et al. |
| 2004/0013052 A1 | 1/2004 | Sako et al. |
| 2004/0047616 A1* | 3/2004 | Uchiumi et al. ............. 386/111 |
| 2004/0052508 A1 | 3/2004 | Iwashita |
| 2004/0062516 A1 | 4/2004 | Takeda et al. |
| 2004/0148315 A1 | 7/2004 | Itho |
| 2004/0190856 A1 | 9/2004 | Kim et al. |
| 2005/0008330 A1* | 1/2005 | Uno ............................... 386/52 |
| 2005/0076063 A1 | 4/2005 | Andoh |
| 2005/0185932 A1* | 8/2005 | Yamamoto et al. ............. 386/95 |

FOREIGN PATENT DOCUMENTS

| | | |
|---|---|---|
| JP | 11-155130 | 6/1999 |
| JP | 11-239320 | 8/1999 |
| JP | 11-261963 | 9/1999 |
| JP | 2003-007000 | 1/2003 |
| JP | 2004-013276 | 1/2004 |
| WO | WO 01/35411 A1 | 5/2001 |

OTHER PUBLICATIONS

International Search Report for corresponding International Application No. PCT/JP2005/017029 mailed Jan. 10, 2006.
Form PCT/ISA/237 and a concise explanation for International Application No. PCT/JP2005/017029 mailed Jan. 10, 2006.
Related U.S. Appl. No. 11/575,407, filed Mar. 16, 2007, now abandoned.
Extended European Search Report for corresponding European Application No. 05783266.9 dated Aug. 2, 2010.
Co-Pending U.S. Appl. No. 11/575,408, filed Mar. 16, 2007 (claims provided).
Result of Consultation for corresponding European Patent App. No. 05783266.9 dated Nov. 13, 2013.

* cited by examiner

FIG.4
(a) V_TSP
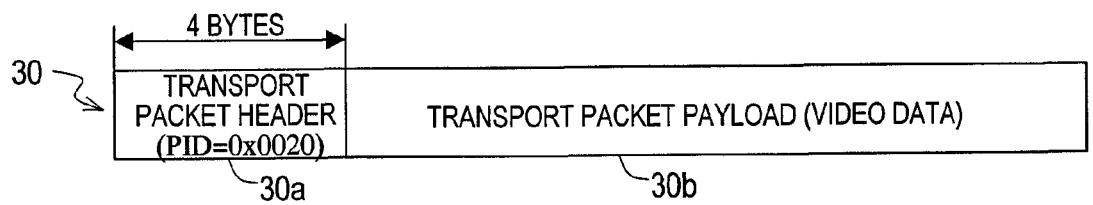
(b) A_TSP
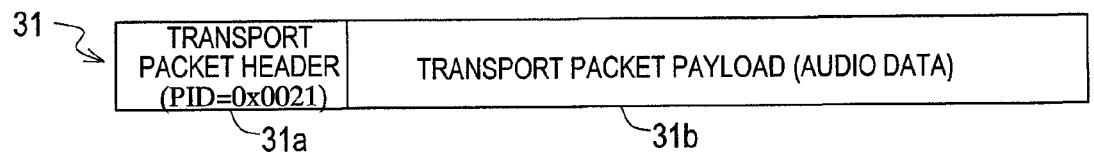

FIG.18
(a) BEFORE PARTIAL DELETION
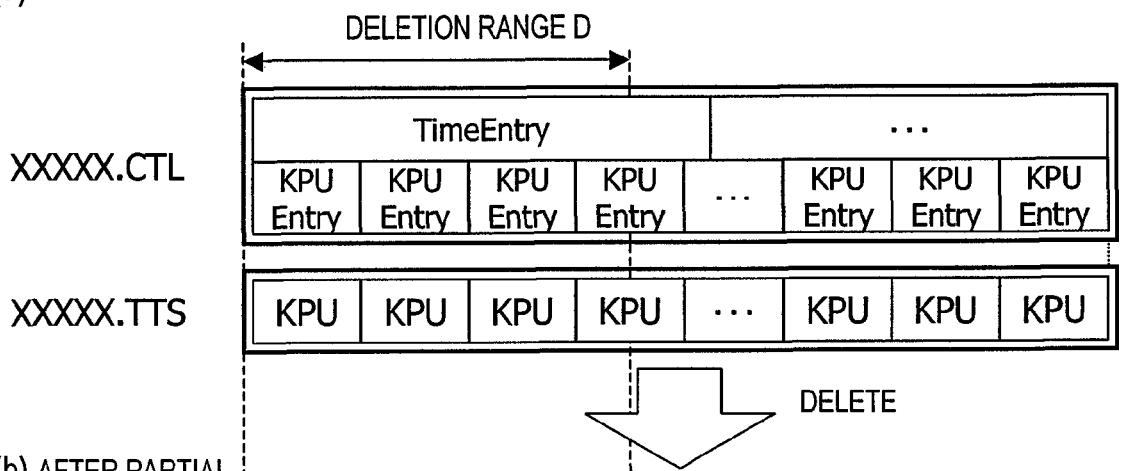
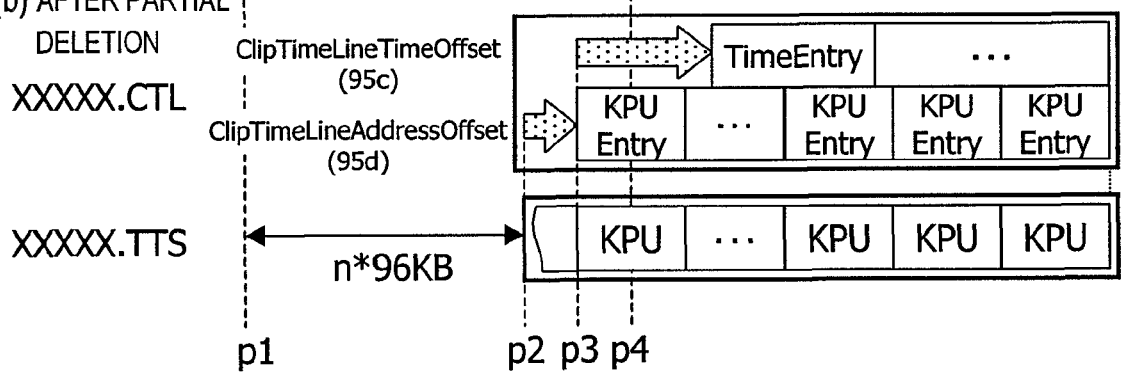

DATA PROCESSOR

TECHNICAL FIELD

The present invention relates to a technique of facilitating the playback and editing of a content by efficiently managing the content data stream on a medium.

BACKGROUND ART

Recently, various types of digital appliances (such as optical disk recorders and camcorders) that can write and store content's digital data on a number of types of media including an optical disk such as a DVD, a magnetic disk such as a hard disk, and a semiconductor memory, have become more and more popular. The content may be a broadcast program or the video and audio that have been captured with a camcorder, for example.

Also, lately PCs often have the functions recording, playing and editing a content, and may also be counted among those digital appliances. In writing data such as document data, PCs have used various media such as a hard disk, an optical disk and a semiconductor memory. That is why a file system that has a data management structure compatible with a PC such as a file allocation table (FAT) has been adopted in such media. The FAT 32 file system that is often adopted currently can handle a file that may have a maximum size of 4 gigabytes or can manage a medium with a maximum storage capacity of 2 terabytes.

The bigger the maximum storage capacity of a medium, the longer the overall playback duration of the content stored there. The optical disks, hard disks, semiconductor memories and so on are so-called "randomly accessible" media. Therefore, when a content data stream with a long duration is stored on such a medium, it would be convenient if playback could be started from any arbitrary point of the content. For example, Patent Document No. 1 generates time map information, defining correspondence between a playback time and the address at which the AV data to play back at the time is stored, at regular time intervals from the beginning of a data stream. If the start time and end time, specified by the user, are converted into a start address and an end address, respectively, by reference to the time map information and if the data stored at those addresses are read, the content can start being played back at the specified time.

Patent Document No. 1: Japanese Patent Application Laid-Open Publication No. 11-155130

DISCLOSURE OF INVENTION

Problems to be Solved by the Invention

However, the longer the playback duration of a content, the more and more often the editing processing needs to be performed to partially delete the content. In that case, it takes an increasingly long time to get the editing done according to the conventional processing. For example, if the contents of a data stream are analyzed, the data of pictures is located within the deletion range, and then the data is deleted, then it takes an analysis time, a data locating time and a deletion time for these purposes.

This problem is particularly sensible when video data that has been compressed and encoded by forward coding and bidirectional coding methods compliant with the MPEG standard is stored on fixed-length data packets that form a transport stream. For example, in partially deleting a series of video data compliant with the MPEG standard, the editor needs to read packets from the medium and analyze the data in the packets to locate the start and end pictures of the deletion range. The packet data may be read on a file system's cluster basis, for example. That is why not only required packets but also other unnecessary packets are read as well, thus taking an extra access time. Furthermore, even if pictures are located and then deleted, the start picture just after the deletion range needs to be turned into a so-called I-picture. Thus, that picture data needs to be read, decoded and re-encoded.

An object of the present invention is to provide means for editing a content data stream quickly.

Means for Solving the Problems

A data processor according to the present invention can edit a content that has been written on a medium. The content is stored in a file as a data stream including multiple packets of the same packet size. And a file system for accessing data on a cluster size basis has been established on the medium. The data processor includes: a receiving section, which receives an instruction on a partial deletion range including the beginning of the file; and a media control section for deleting data, the size of which is an integral number of times as large as the least common multiple of the cluster size and the packet size, from the beginning of the file within the partial deletion range.

The data stream includes a plurality of pictures and also includes a playback unit with one or more decoding units that need to be decoded from a base picture. The media control section may write a data size value, representing a size as measured from the beginning of the file, from which the data has already been deleted, through the first playback unit in the data stream, on the medium.

For the data stream from which the data has not been deleted yet, time entries have been written on the medium. The time entries show the data locations of pictures to be played back at regular intervals in the content. The media control section may write a data size value, representing a size as measured from the top of the first playback unit in the data stream, from which the data has already been deleted, through the data location of the first picture identified by one of the time entries, on the medium.

The data stream is made up of multiple packets, each having a packet size of 192 bytes, and a file system for accessing data on the basis of a cluster having a size of 32 kilobytes has been established on the medium. The media control section may delete data, the size of which is an integral multiple of 96 kilobytes.

On receiving an instruction on a partial deletion range including the end of the file, the media control section may delete data, the size of which is an integral multiple of the packet size as measured from the end of the file within the partial deletion range.

The media control section may delete data of imperfect playback units of the data stream from the partial deletion range.

A chip circuit according to the present invention is built in a data processor in order to edit a content that has been written on a medium. The content is stored in a file as a data stream including multiple packets of the same packet size. And a file system for accessing data on a cluster size basis has been established on the medium. The data processor includes a receiving section, which receives an instruction on a partial deletion range including the beginning of the file. The chip circuit performs the steps of: locating data, the size of which is an integral number of times as large as the least common multiple of the cluster size and the packet size as measured from the beginning of the file within the range; and outputting an instruction to delete the data that has been located.

A computer program according to the present invention is executed by a data processor that performs processing of editing a content that has been written on a medium. The content is stored in a file as a data stream including multiple packets of the same packet size. And a file system for accessing data on a cluster size basis has been established on the medium. In executing the computer program, the data processor performs the steps of: receiving an instruction on a range including the beginning of the file; and deleting data, the size of which is an integral number of times as large as the least common multiple of the cluster size and the packet size, from the beginning of the file within the range.

A data processing method according to the present invention is carried out to edit a content that has been written on a medium. The content is stored in a file as a data stream including multiple packets of the same packet size. And a file system for accessing data on a cluster size basis has been established on the medium. The method includes the steps of: receiving an instruction on a partial deletion range including the beginning of the file; and deleting data, the size of which is an integral number of times as large as the least common multiple of the cluster size and the packet size, from the beginning of the file within the partial deletion range.

Effects of the Invention

According to the present invention, in partially deleting the data of a data stream from a medium, the size of the data deleted is an integral number of times as large as the least common multiple of the cluster size of a file system and the packet size of the data stream. If the size of the data deleted is an integral number of times as large as the cluster size, data deletion processing on the medium can be carried out on an access unit basis. Also, if the size of the data deleted is an integral number of times as large as the packet size of packets, data deletion processing can be carried out on a packet-by-packet basis, thus speeding up the processing.

In addition, among the playback units that have been included in the data stream, a data size value representing a size as measured from the beginning of the data stream, from which the data has already been deleted, through the first playback unit is retained. That is why during the deletion processing, there is no need to change pictures into I-pictures right after the deletion. Since the processing of getting the pictures changed into I-pictures can be omitted, the editing processing can get done in a shorter time.

BRIEF DESCRIPTION OF DRAWINGS

FIG. 4(*a*) shows the data structure of a video TS packet 30 and FIG. 4(*b*) shows the data structure of an audio TS packet 31.

Figure 5:
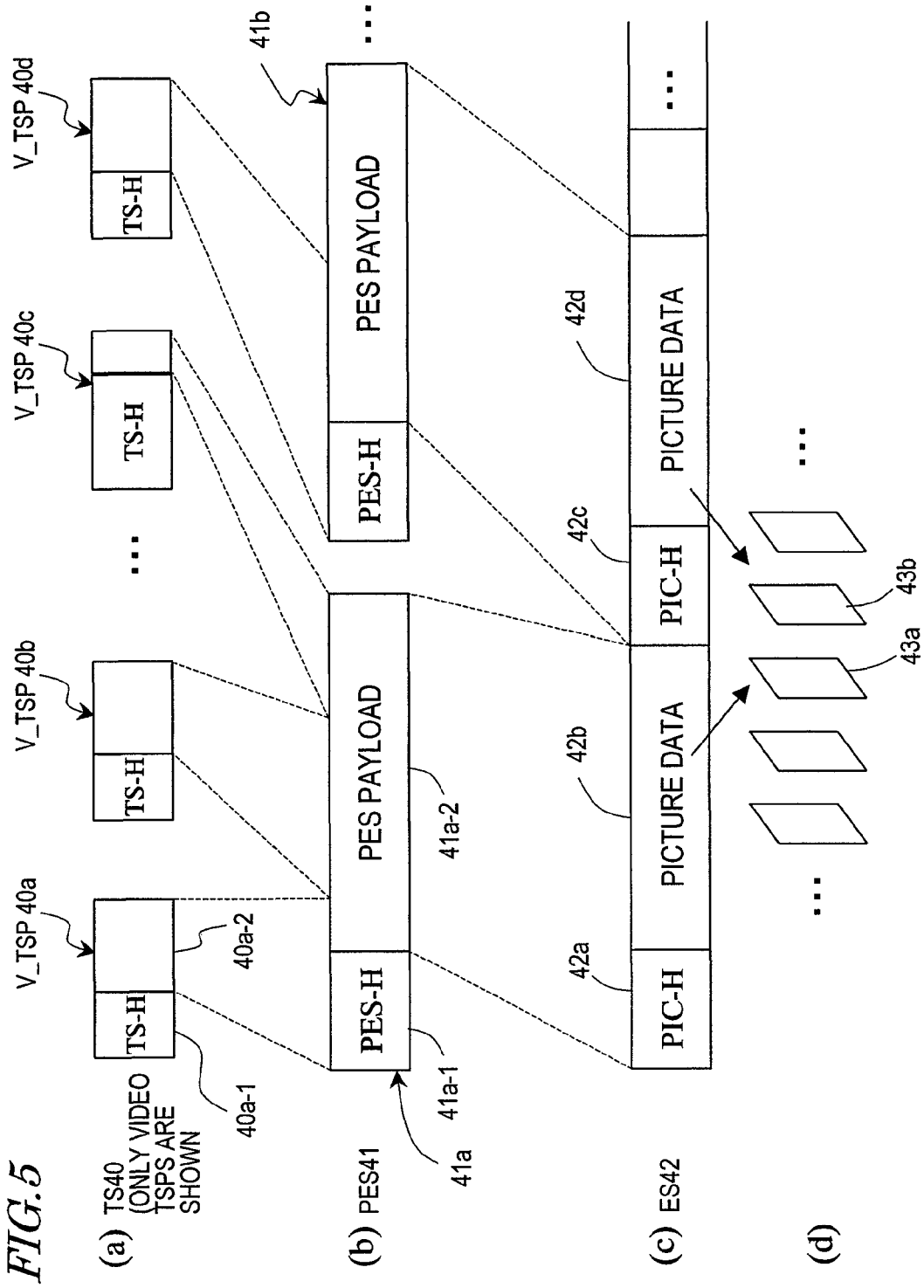

Portions (a) to (d) of FIG. 5 show a stream correlation to be established when video pictures are played back from video TS packets.

Figure 6:
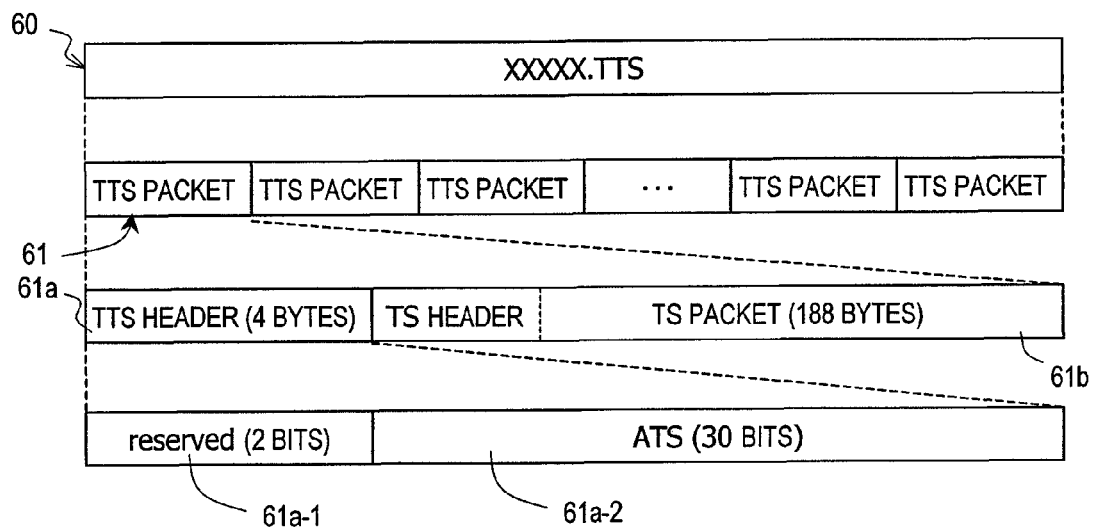

FIG. 6 shows the data structure of a clip AV stream 60.

Figure 7:
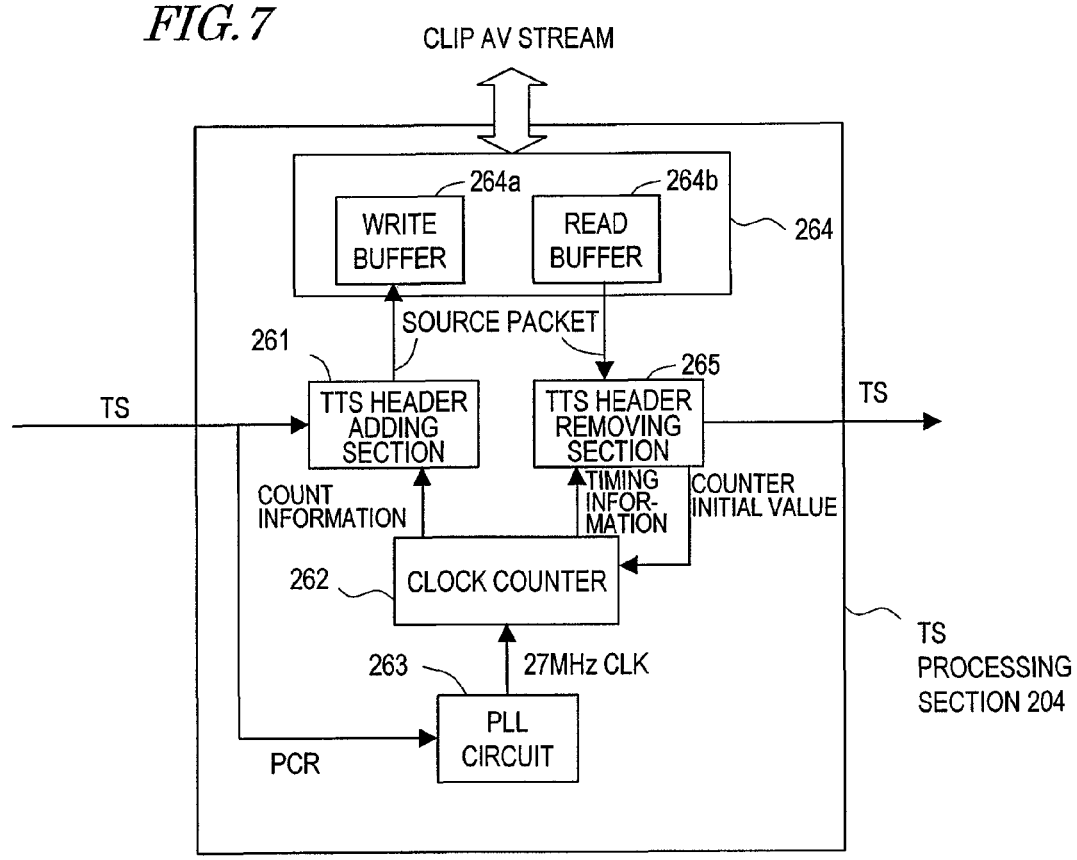

FIG. 7 shows an arrangement of functional blocks for the TS processing section 204.

Figure 8:
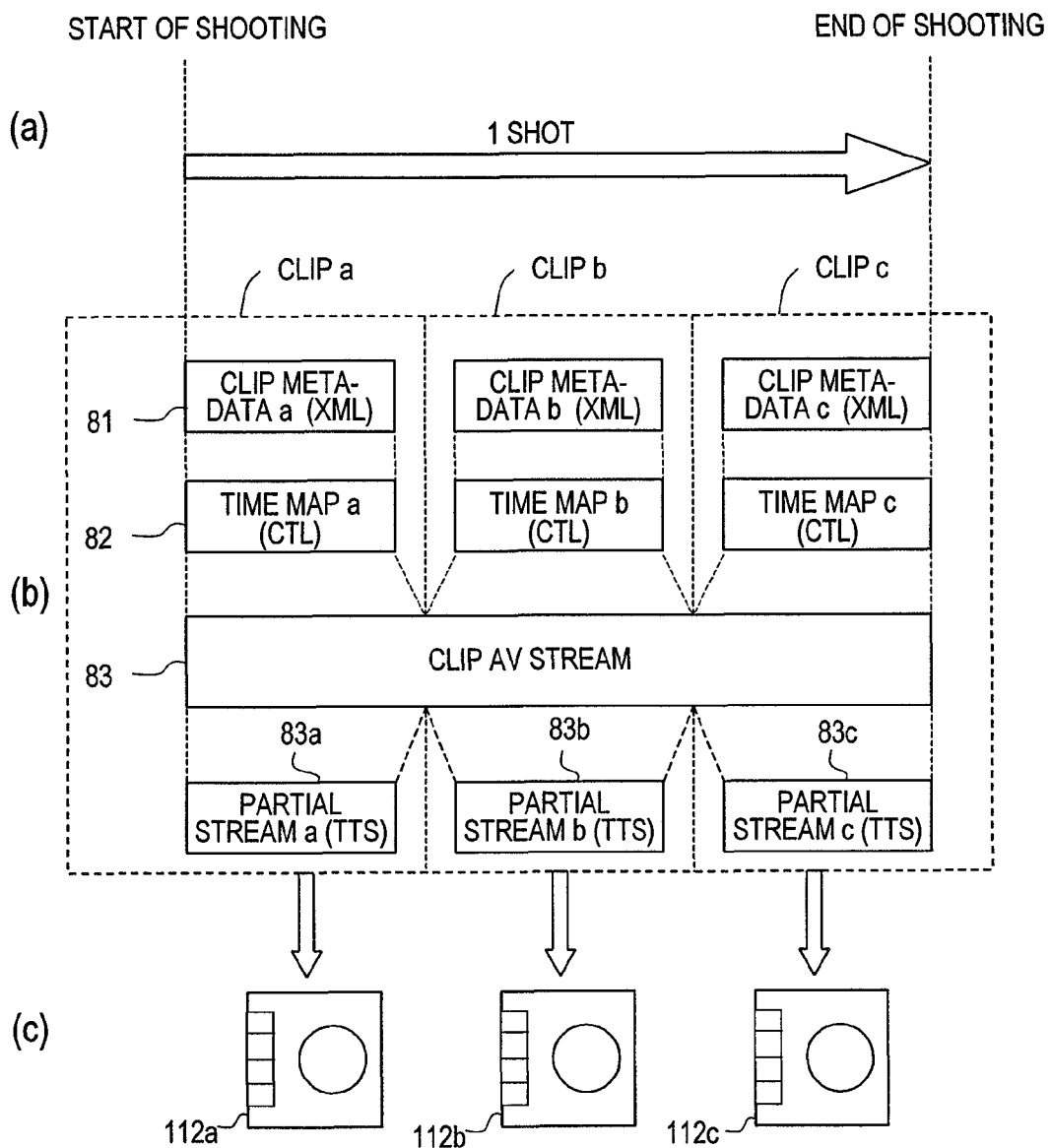

Portion (a) of FIG. 8 shows the concept of a single content according to this preferred embodiment, portion (b) of FIG. 8 shows the concept of clips, each including the management information of the content and stream data, and portion (c) of FIG. 8 shows three removable HDDs 112.

Figure 9:
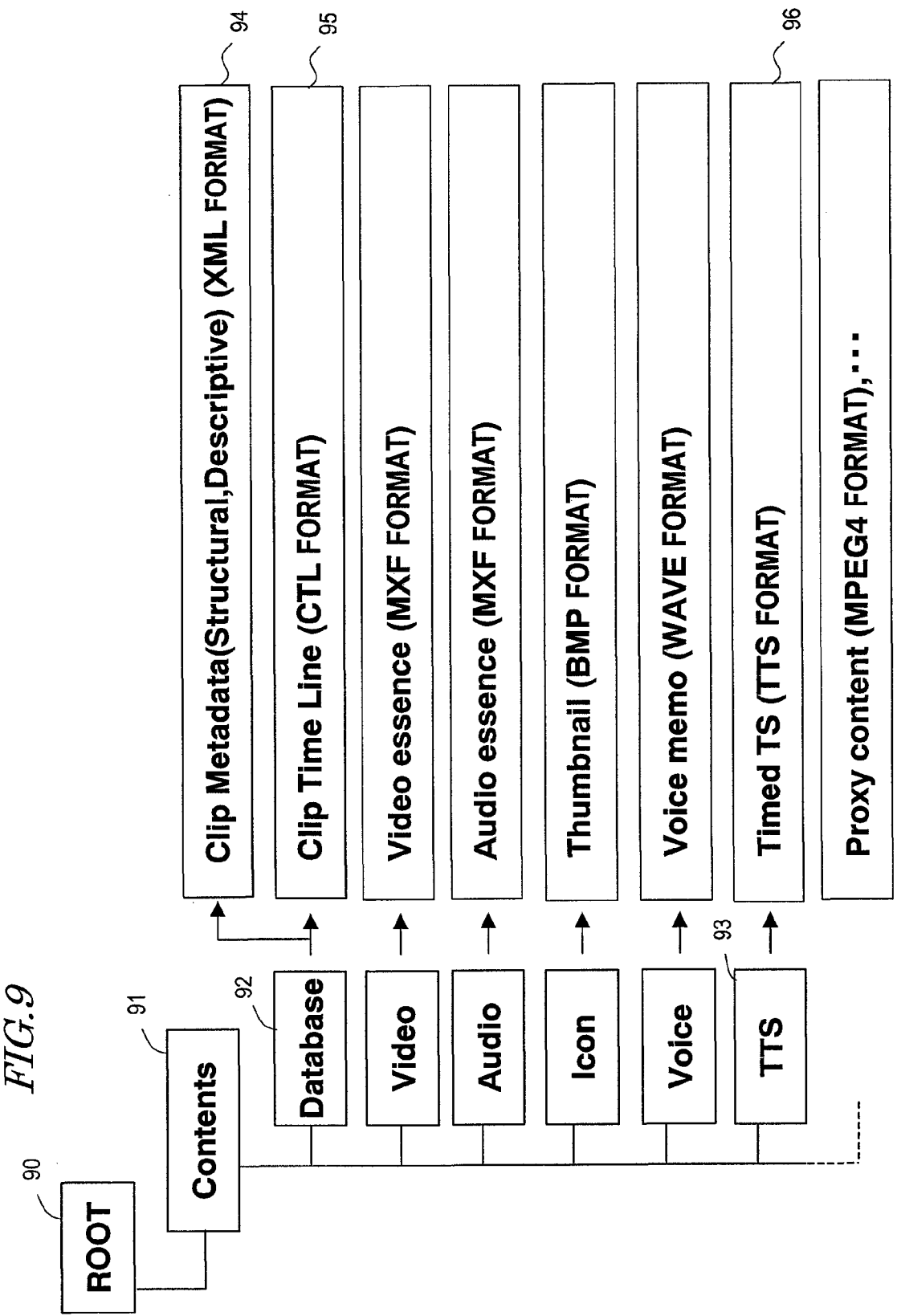

FIG. 9 shows the hierarchical directory structure in the removable HDD 112.

Figure 10:
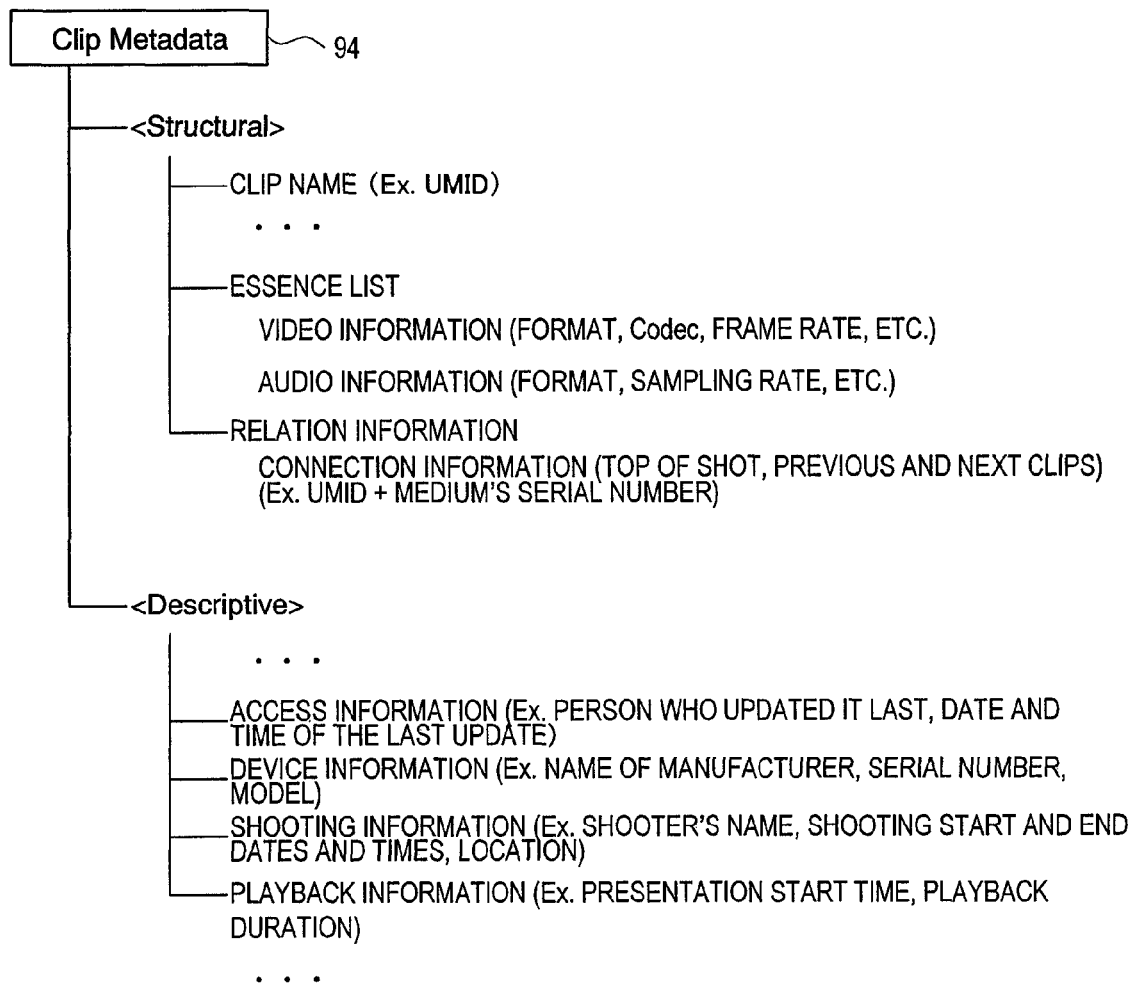

FIG. 10 shows the contents of information included in the clip meta-data 94.

Figure 11:
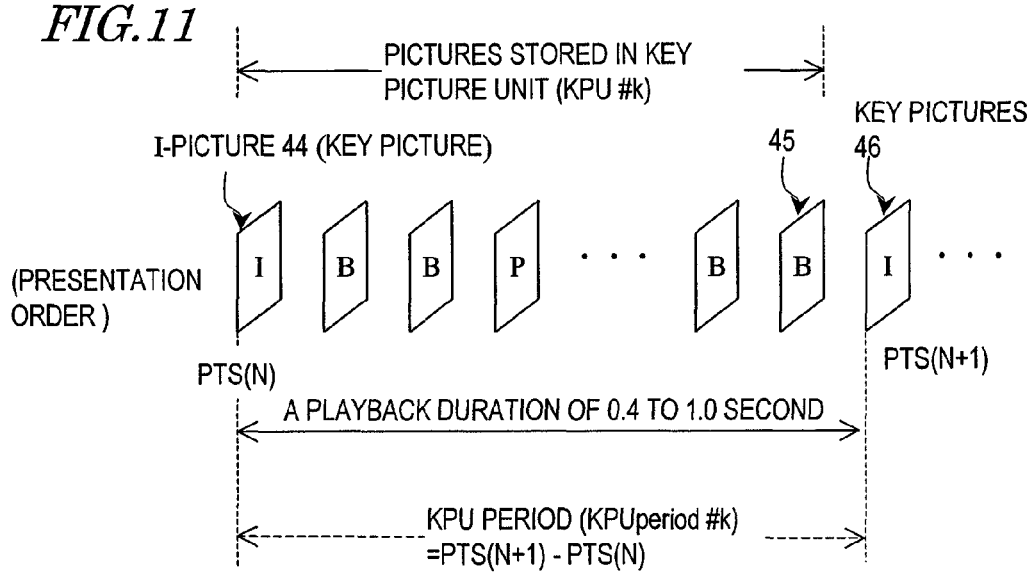

FIG. 11 shows a relation between key pictures and a key picture unit.

Figure 12:
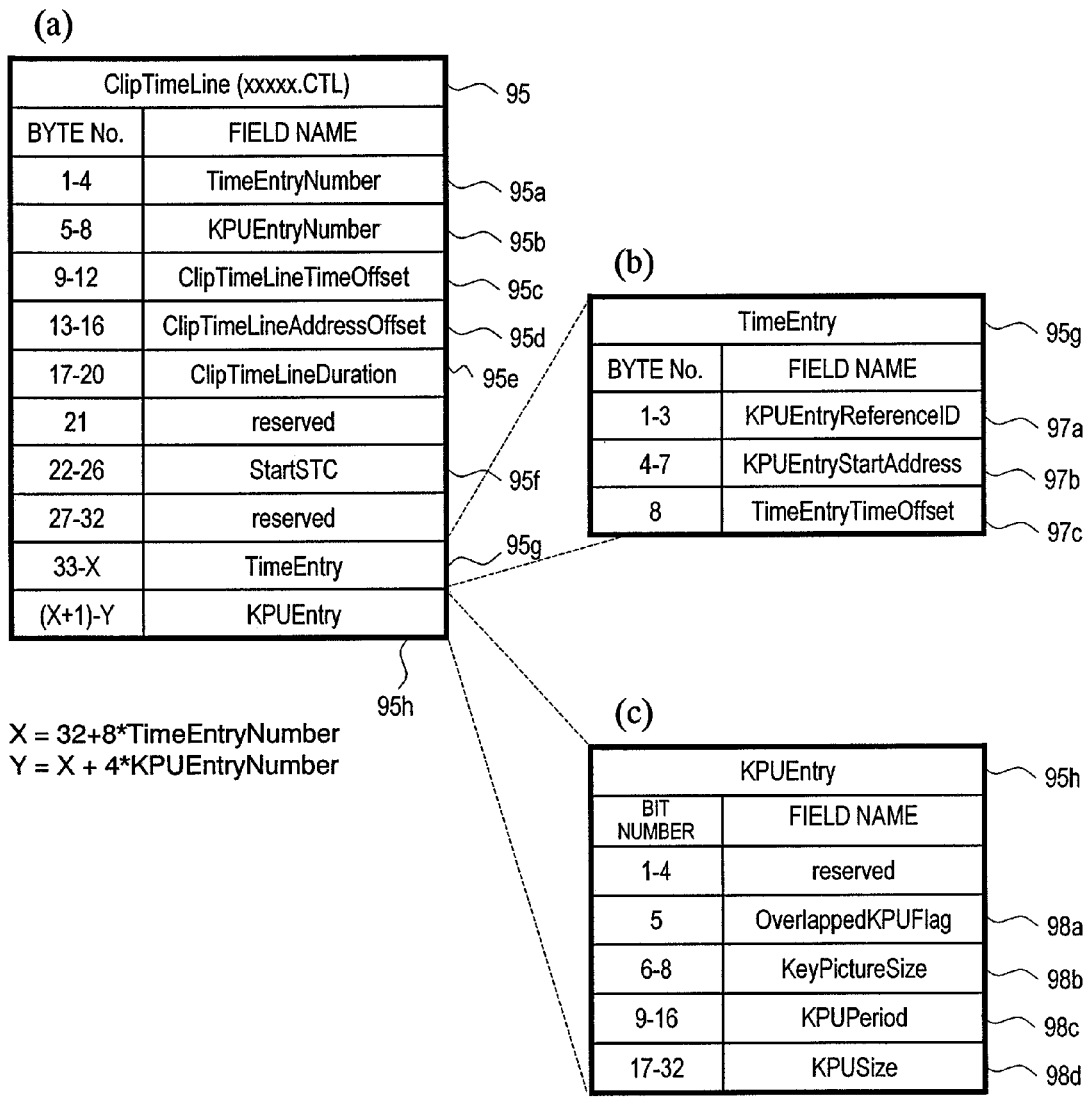

Portion (a) of FIG. 12 shows the data structure of the clip time line (ClipTimeLine) 95; portion (b) of FIG. 12 shows the data structure of the TimeEntry field 95*g* for one time entry; and portion (c) of FIG. 12 shows the data structure of the KPUEntry field 95*h* for one KPU entry.

Figure 13:
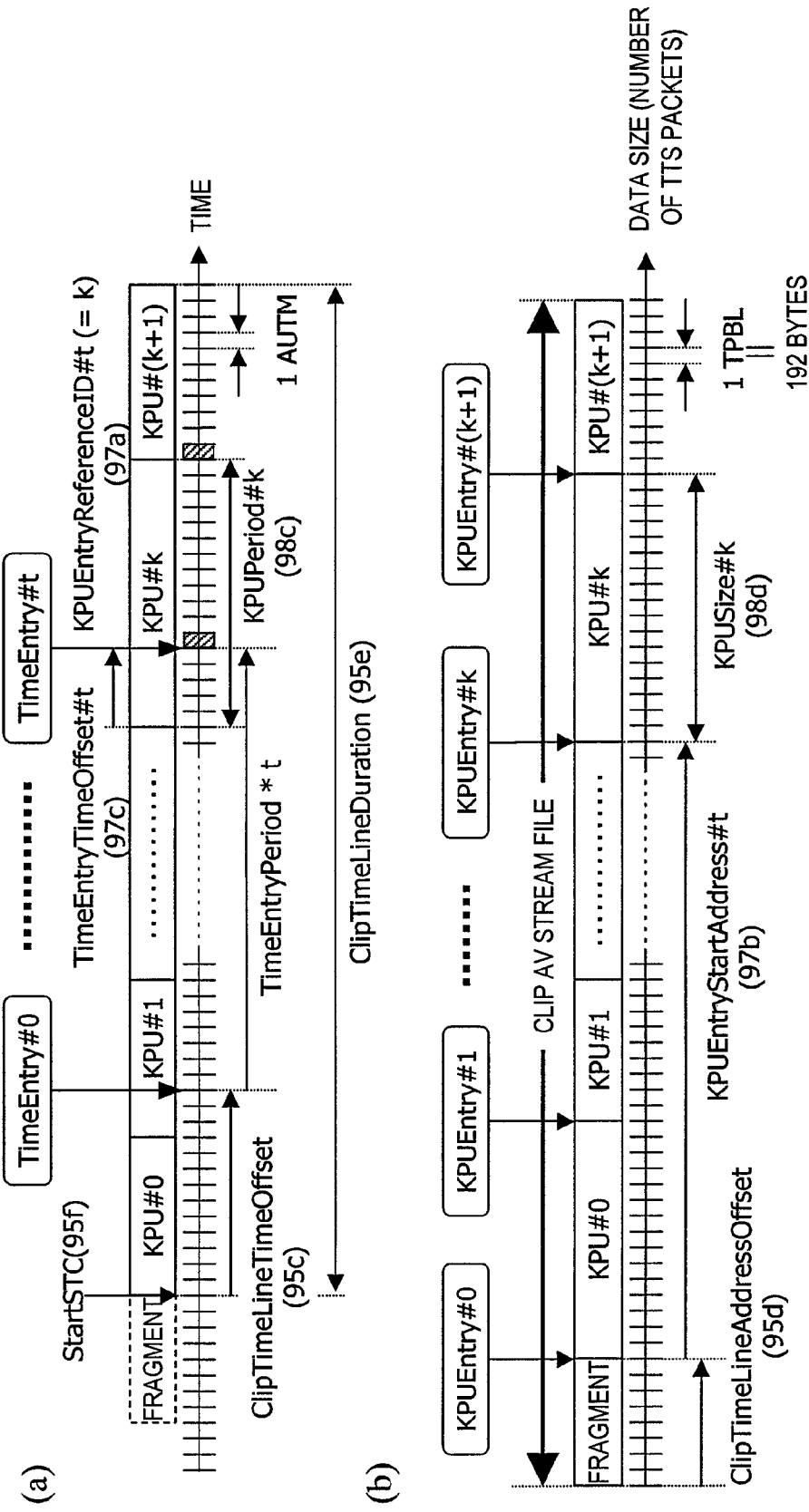

FIG. 13(*a*) shows a relation between the time entries and fields included in the clip time line 95 and FIG. 13(*b*) shows a relation between the KPU entries and fields included in the clip time line 95.

Figure 14:
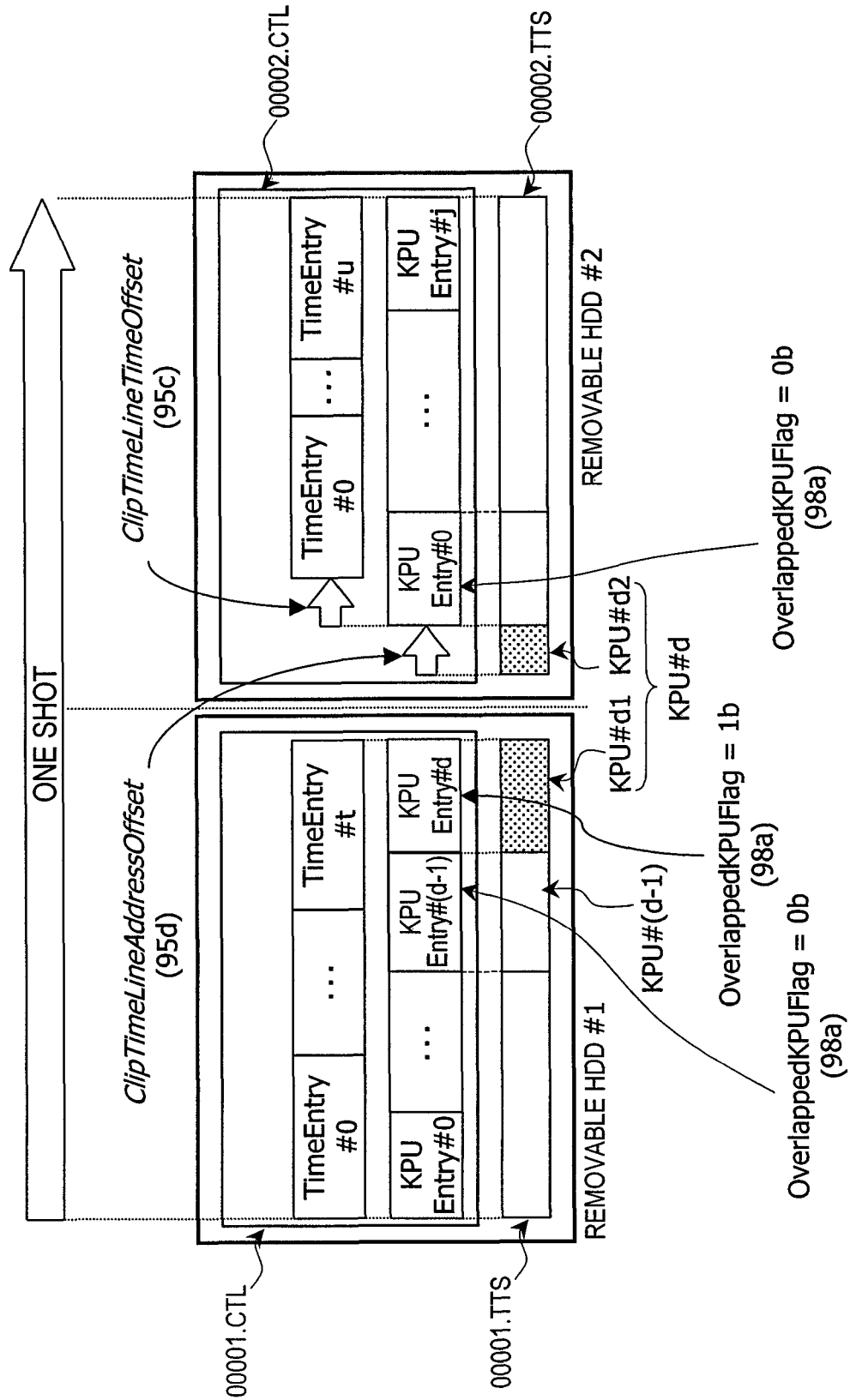

FIG. 14 shows the management information and clip AV stream of a content for one shot that are stored separately in two removable HDDs.

Figure 15:
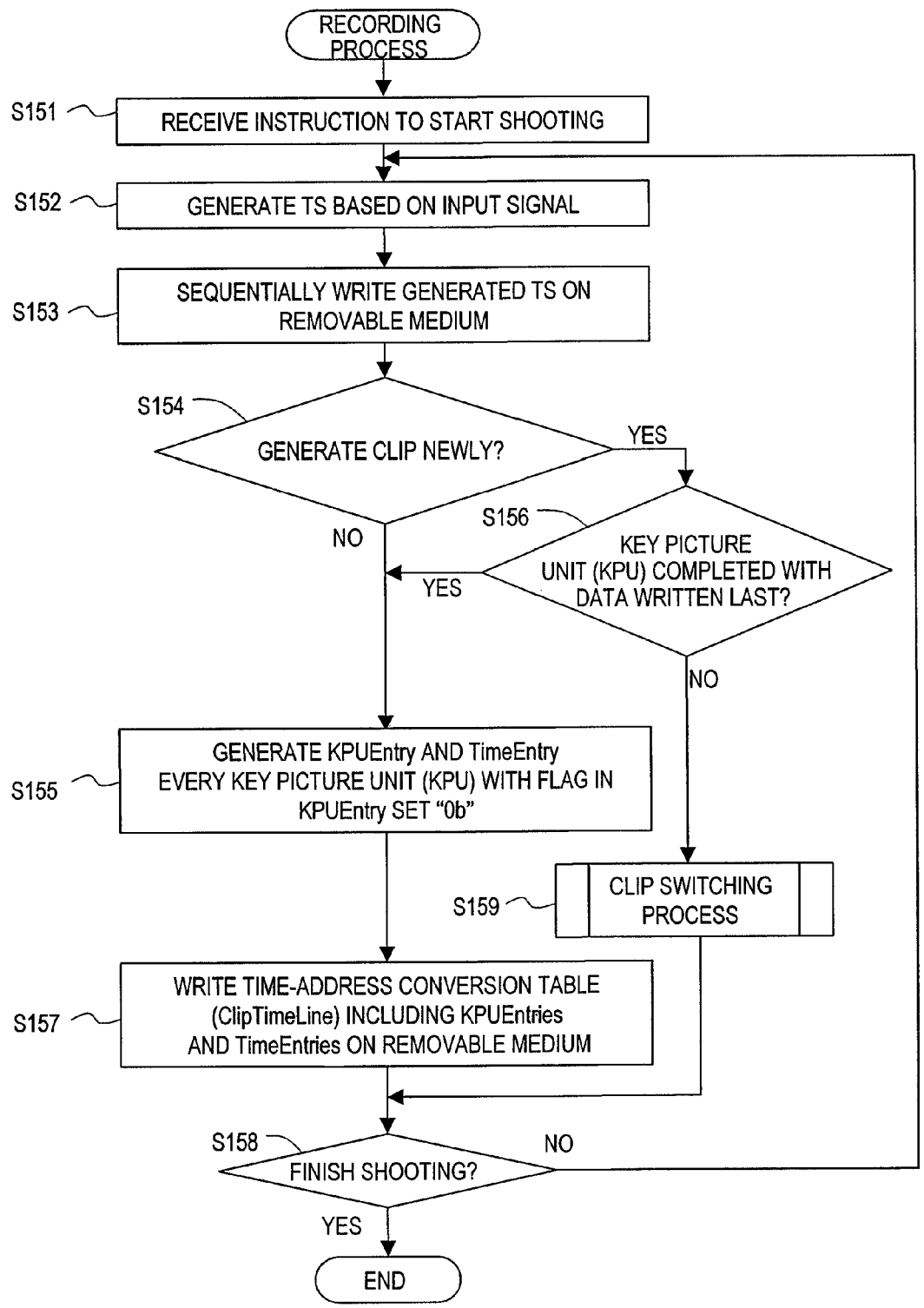

FIG. 15 shows the procedure of the content recording processing to be done by the camcorder 100.

Figure 16:
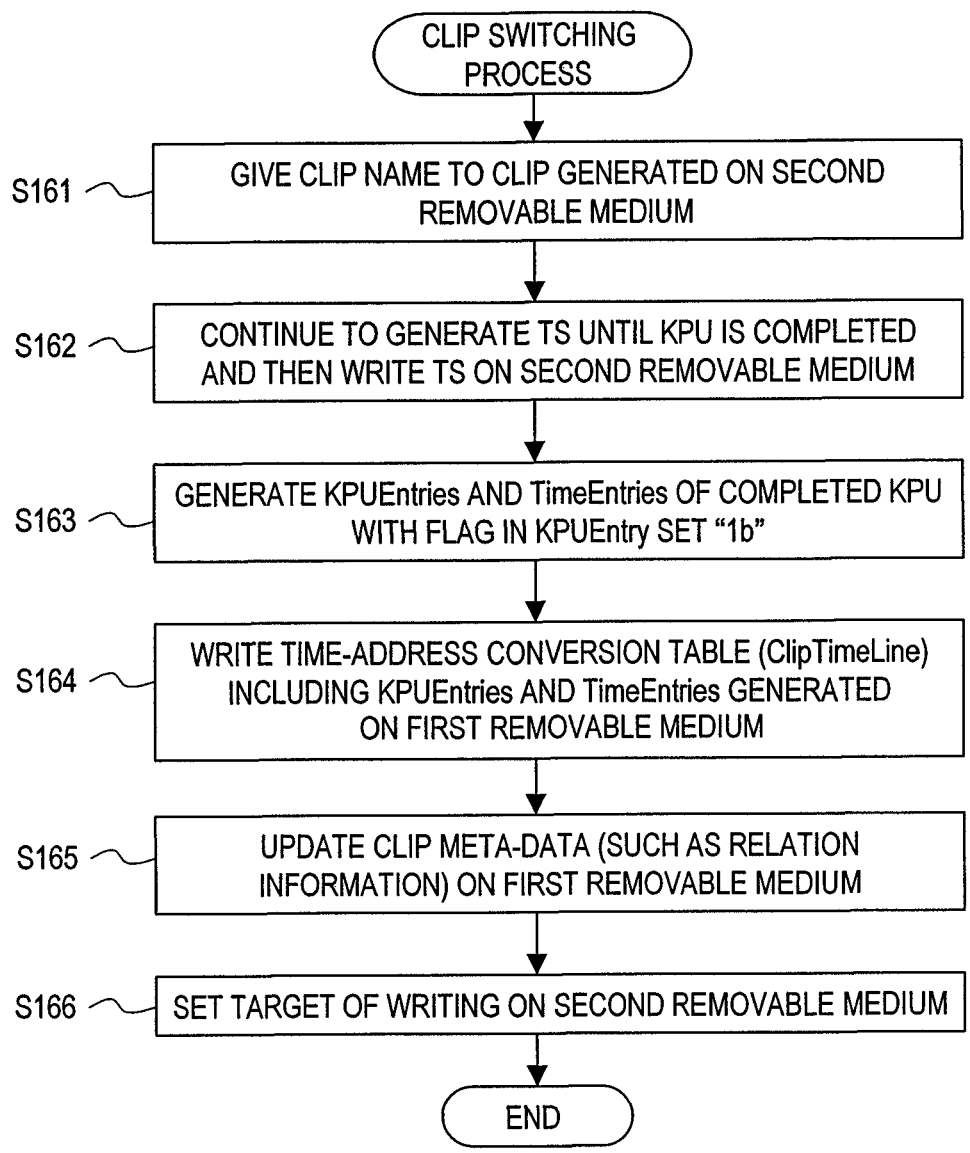

FIG. 16 shows the procedure of the medium switching processing.

Figure 17:
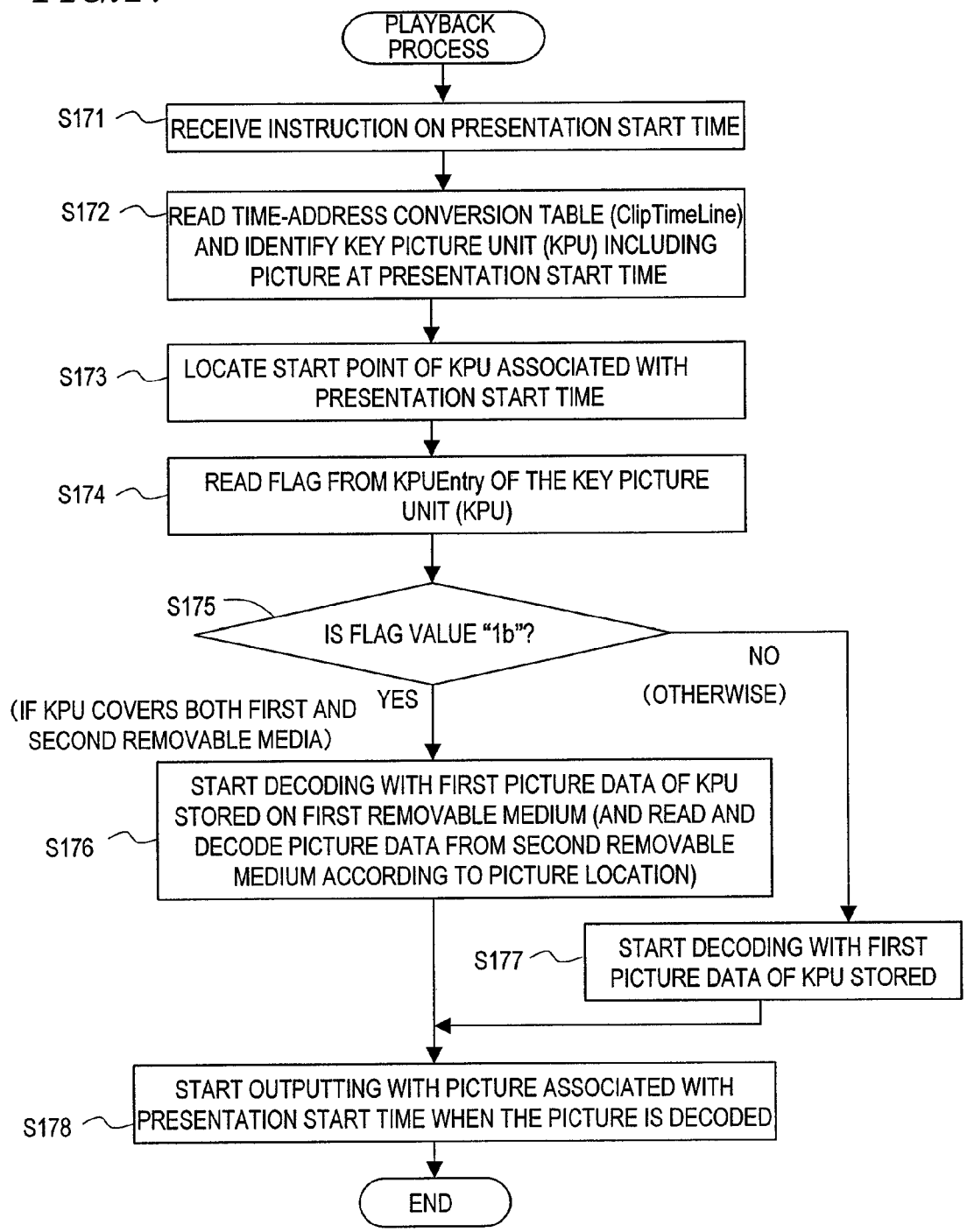

FIG. 17 shows the procedure of content playback processing to be done by the camcorder 100.

Portions (a) and (b) of FIG. 18 show how the relation between the management information and the clip AV stream changes before and after a top portion of the TTS file has been deleted by editing.

Figure 19:
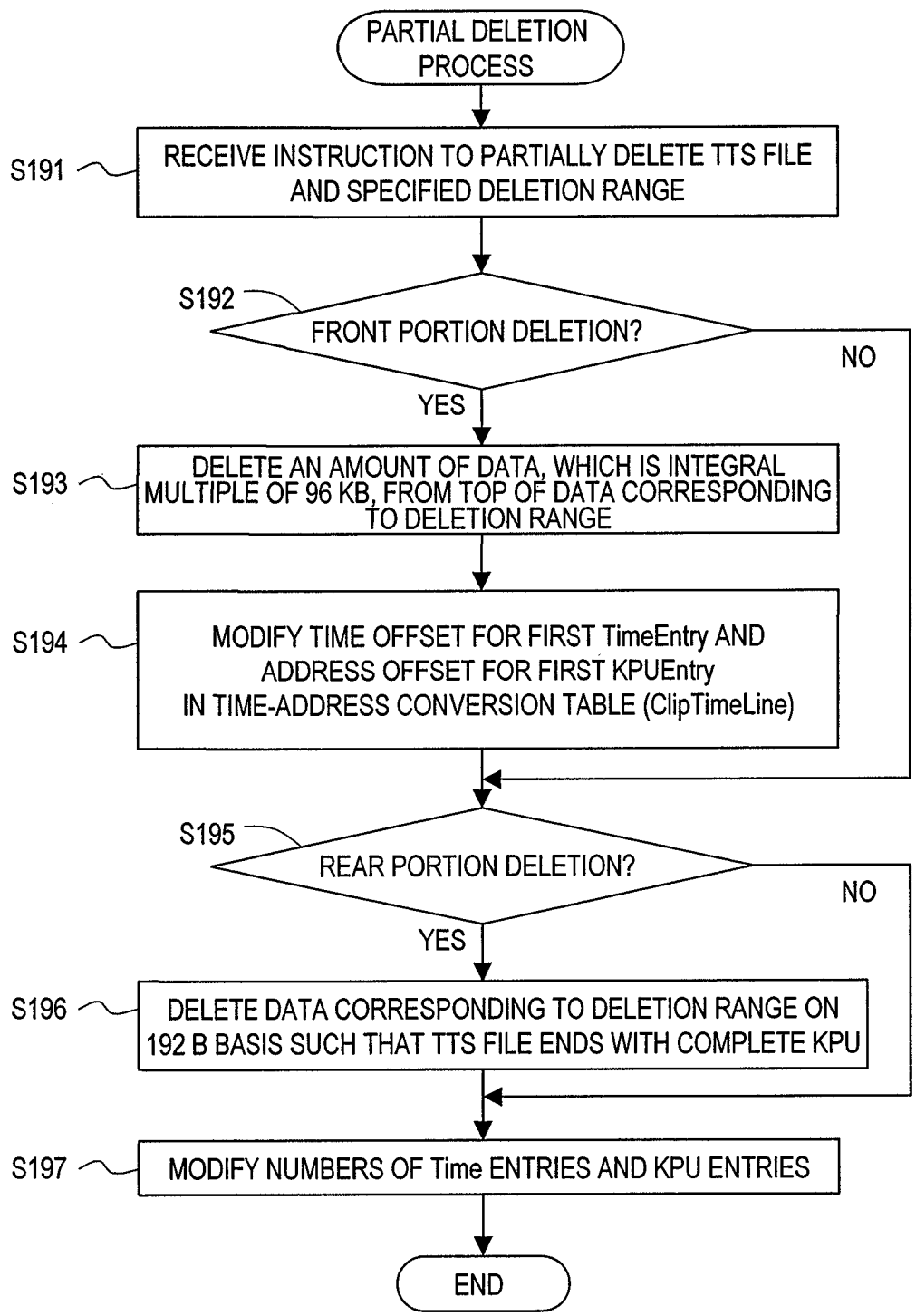

FIG. 19 shows the procedure of content partial deletion processing to be done by the camcorder 100.

DESCRIPTION OF REFERENCE NUMERALS

100 camcorder
108 PC
112 removable HDD
201*a* CCD
201*b* microphone
202 A/D converter
203 MPEG-2 encoder
204 TS processing section
205 media control section
206 MPEG-2 decoder
207 graphic control section
208 memory
209*a* LCD
209*b* loudspeaker
210 program ROM
211 CPU
212 RAM
213 CPU bus
214 network control section
215 instruction receiving section
216 interface (I/F) section
250 system control section
261 TTS header adding section
262 clock counter
263 PLL circuit
264 buffer
265 TTS header removing section

BEST MODE FOR CARRYING OUT THE INVENTION

Hereinafter, preferred embodiments of a data processor according to the present invention will be described with reference to the accompanying drawings.

Figure 1:
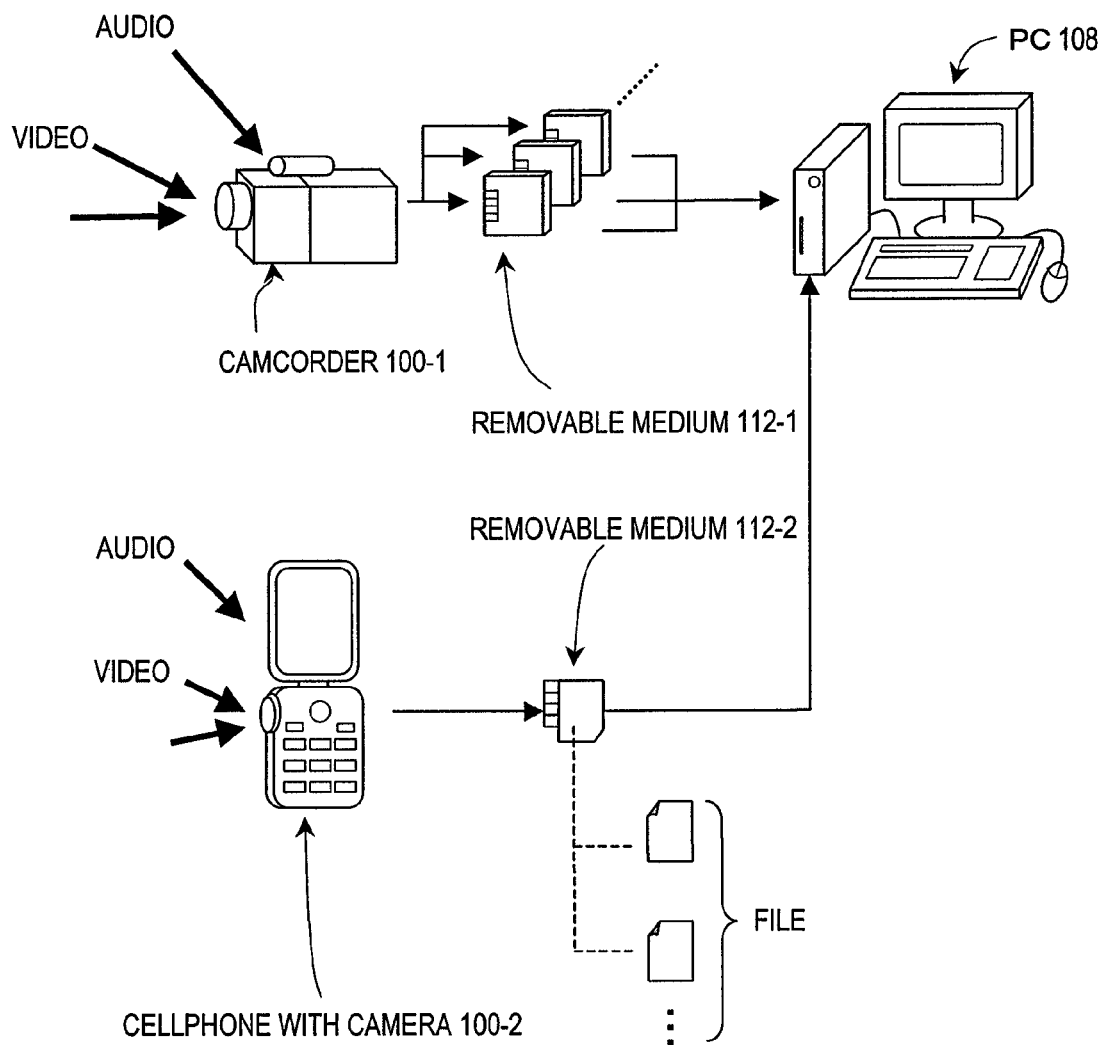
FIG. 1 illustrates multiple types of data processors that operate in association with each other by way of removable media.

FIG. 1 illustrates multiple types of data processors that operate in association with each other by way of removable media. In FIG. 1, the data processors are illustrated as a camcorder 100-1, a cellphone with camera 100-2 and a PC 108. The camcorder 100-1 and cellphone with camera 100-2 receive video and audio that have been captured by the user, encode them into digital data streams, and write the data streams on removable media 112-1 and 112-2, respectively. The data that has been written on each of these removable media is handled as a file on the file system that has been established on the removable medium. For example, FIG. 1 shows that a number of files are stored in the removable medium 112-2.

These removable media 112-1 and 112-2 are removable from the data processors and may be optical disks such as DVDs or BDs (Blu-ray Discs), ultra-small hard disks such as a micro drive, or semiconductor memories. The PC 108 includes a slot that can be loaded with each of these removable media 112-1 and 112-2, and reads data from the removable medium 112-1 or 112-2 inserted to perform playback or editing processing, for example.

In the removable HDD 112, data management is done based on the FAT 32 file system. According to the FAT 32 file system, a single file may have a file size of no greater than 4 gigabytes, for example. That is to say, according to the FAT 32 file system, if the data size exceeds 4 gigabytes, the data needs to be written in two or more files separately. For example, in a removable HDD 112 with a storage capacity of 8 gigabytes, two 4-gigabyte files may be stored. And four 4-gigabyte files may be stored in a 16-gigabyte removable HDD 112. It should be noted that the data size limit, beyond which the data needs to be written separately, does not have to be equal to, but may be just less than, the maximum file size.

In the following description, the data processor that writes a content data stream on a removable medium is supposed to be a camcorder, and the data processor that plays back and edits the data stream stored in the removable medium is supposed to be a PC.

Furthermore, the removable medium 112-1 is supposed to be an ultra-small removable hard disk. Just like a known micro drive, the removable medium has a drive mechanism for reading and writing data by driving a hard disk. Thus, the removable medium 112-1 will be referred to herein as the "removable HDD 112". For the sake of simplicity of description, the removable HDD 112 is supposed to have a storage capacity of 4 gigabytes. That is why a content with a size of more than 4 gigabytes is written on two or more removable HDDs. However, even if the removable HDD has a storage capacity of more than 4 gigabytes and if a content with a size exceeding 4 gigabytes is going be written there, the content may also be written as two or more files on the same removable HDD. These two situations are essentially the same, because in both cases, a single content is recorded in multiple files separately, no matter whether the target storage medium is single or not. The removable HDD 112 has a cluster size of 32 kilobytes, for example. As used herein, the "cluster" is the minimum access unit for reading and writing data.

Figure 2:
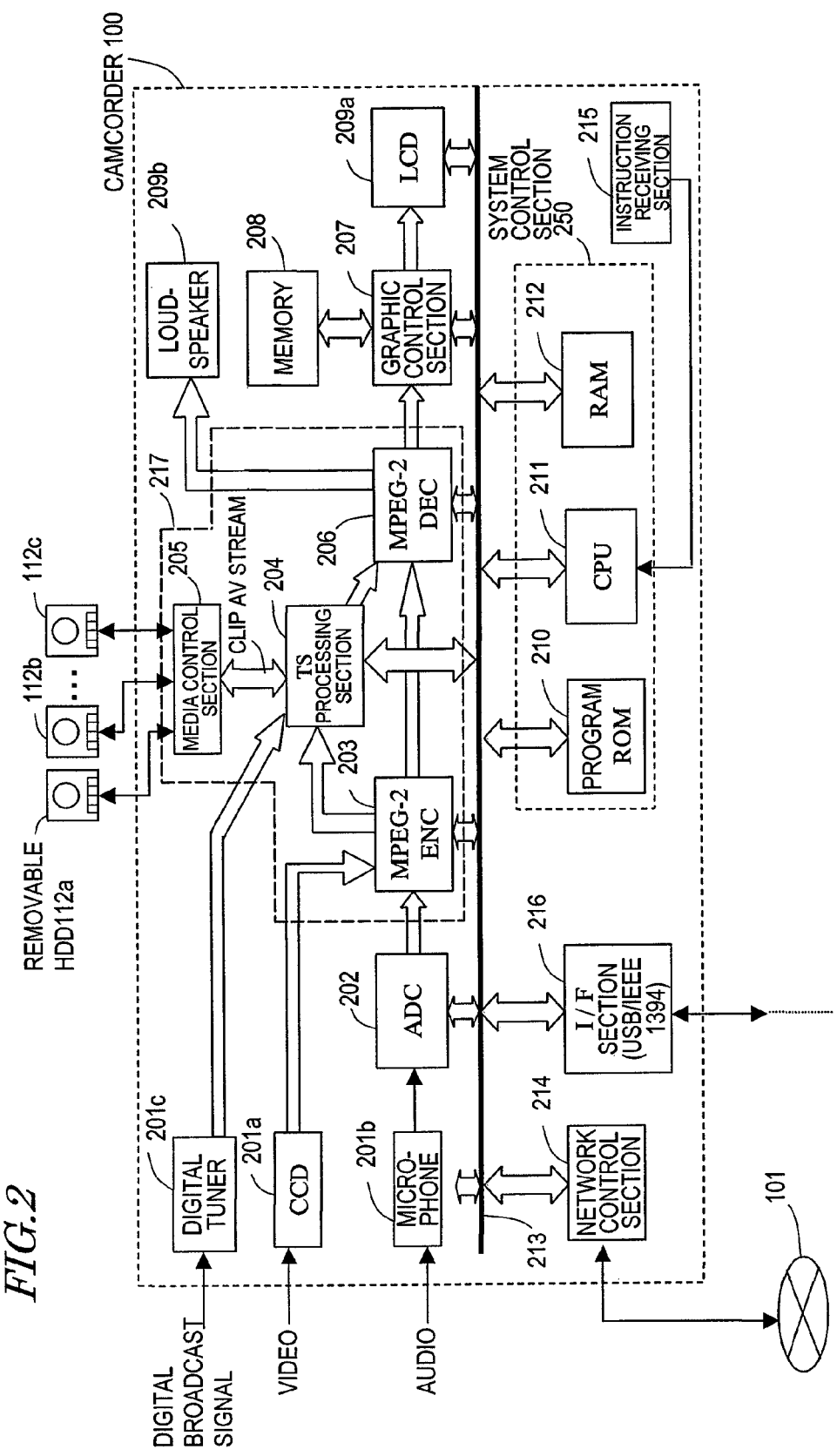
FIG. 2 shows an arrangement of functional blocks in the camcorder 100.

FIG. 2 shows an arrangement of functional blocks in the camcorder 100. The camcorder 100 may be loaded with multiple removable HDDs 112a, 112b, ... and 112c at the same time, and writes a content data stream with video and audio that have been captured by the user (i.e., a clip AV stream) on the removable HDDs 112a, 112b, ... and 112c sequentially.

The camcorder 100 includes a CCD 201a, a microphone 201b, a digital tuner 201c for receiving a digital broadcast, an A/D converter 202, an MPEG-2 encoder 203, a TS processing section 204, a media control section 205, an MPEG-2 decoder 206, a graphic control section 207, a memory 208, a liquid crystal display (LCD) 209a, a loudspeaker 209b, a CPU bus 213, a network control section 214, an instruction receiving section 215, an interface (I/F) section 216, and a system control section 250.

Hereinafter, the functions of these components will be described one by one. The CCD 201a and the microphone 201b receive an analog video signal and an analog audio signal, respectively. The CCD 201a outputs video as a digital signal, while the microphone 201b outputs an analog audio signal. The A/D converter 202 converts the incoming analog audio signal into a digital signal and supplies the digital signal to the MPEG-2 encoder 203.

The digital tuner 201c functions as a receiving section that receives a digital signal, including one or more programs, from an antenna (not shown). In a transport stream transmitted as a digital signal, packets of multiple programs are included. The digital tuner 201c extracts and outputs a packet representing a particular program (i.e., the program on the channel to be recorded) from the transport stream received. The stream being output is also a transport stream but will sometimes be referred to herein as a "partial transport stream" to tell it from the original stream. The data structure of the transport stream will be described later with reference to FIGS. 3 to 5.

In this preferred embodiment, the camera 100 is supposed to include the digital tuner 201c. However, this is not an essential requirement. As the configuration of the camcorder 100 shown in FIG. 2 is also applicable to the cellphone with camera 100-2 that has already been described with reference to FIG. 1, the tuner may also be a component of a cellphone with camera that can receive a digital broadcast and make it ready for viewing and listening to.

On receiving an instruction to start recording, the MPEG-2 encoder 203 (which will be simply referred to herein as an "encoder 203") compresses and encodes the supplied digital audio and video data compliant with an MPEG standard. In this preferred embodiment, the encoder 203 compresses and encodes the supplied video data into the MPEG-2 format, generates a transport stream (which will be referred to herein as a "TS") and passes it to the TS processing section 204. This processing is continued until the encoder 203 receives an instruction to end the recording. To perform bidirectional compression coding, the encoder 203 includes a buffer (not shown) for temporarily storing reference pictures and so on. It should be noted that the video and audio do not have to be encoded compliant with the same standard. For example, the video may be compressed and encoded in the MPEG format and the audio may be compressed and encoded in the AC-3 format.

In this preferred embodiment, the camcorder 100 generates and processes a TS. Therefore, the data structure of a TS will be described first with reference to FIGS. 3 through 5.

Figure 3:
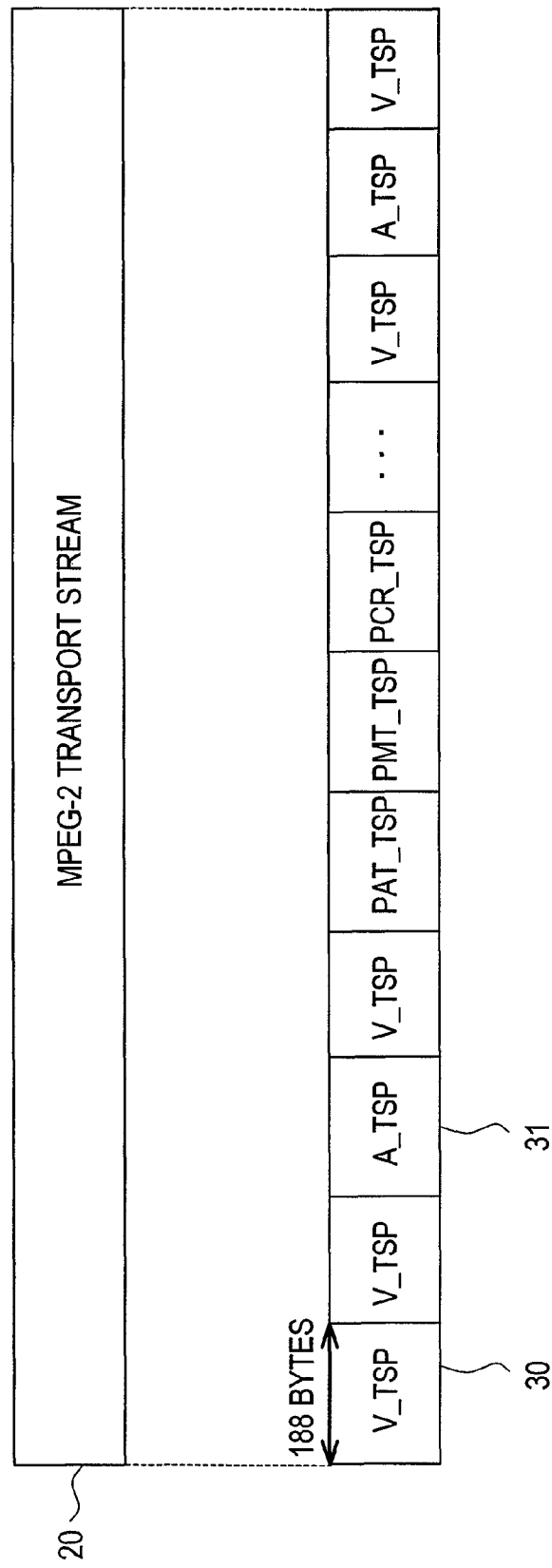
FIG. 3 shows the data structure of a transport stream (TS) 20.

FIG. 3 shows the data structure of a transport stream (TS) 20. Examples of TS packets include a video TS packet (V_TSP) 30 in which compressed video data is stored, an audio TS packet (A_TSP) 31 in which compressed audio data is stored, a packet (PAT_TSP) in which a program association table (PAT) is stored, a packet (PMT_TSP) in which a program map table (PMT) is stored, and a packet (PCR_TSP) in which an program clock reference (PCR) is stored. Each of these TS packets has a data size of 188 bytes. Also, TS packets such as PAT_TSP and PMT_TSP that describe the program arrangement of TS are generally called "PSI/SI packets".

Hereinafter, the video TS packets and audio TS packets, all of which are relevant to the processing of the present invention, will be described. FIG. 4(a) shows the data structure of a video TS packet 30. The video TS packet includes a transport packet header 30a of 4 bytes and transport packet payload 30b of 184 bytes. Video data 30b is stored in the payload 30b. On the other hand, FIG. 4(b) shows the data structure of an audio TS packet 31. The audio TS packet 31 also includes a transport packet header 31a of 4 bytes and transport packet payload 31b of 184 bytes. Audio data 31b is stored in the transport packet payload 31b. Data called "adaptation field" may be added to the TS packet header and may be used to align data to be stored in the TS packet. In that case, the payload 30b, 31b of the TS packet has a size of less than 184 bytes.

As can be seen from this example, a TS packet is usually made up of a transport packet header of 4 bytes and elementary data of 184 bytes. In the packet header, a packet identifier (PID) showing the type of that packet is described. For example, the PID of a video TS packet is 0x0020, while that of an audio TS packet is 0x0021. The elementary data may be content data such as video data or audio data or control data for controlling the playback. The type of the data stored there changes according to the type of the packet.

Hereinafter, the relationship between video data and pictures that form video will be described as an example. Portions (a) to (d) of FIG. 5 show a stream correlation to be established when video pictures are played back from video TS packets. As shown in portion (a) of FIG. 5, the TS 40 includes video TS packets 40a through 40d. Although the TS 40 may include other packets, only those video TS packets are shown here. A video TS packet can be easily identifiable by the PID stored in its header 40a-1.

A packetized elementary stream is made up of the video data of respective video TS packets such as the video data 40a-2. Portion (b) of FIG. 5 shows the data structure of a packetized elementary stream (PES) 41. The PES 41 includes a plurality of PES packets 41a, 41b, etc. The PES packet 41a is made up of a PES header 41a-1 and PES payload 41a-2. These data are stored as the video data of the video TS packets.

Each PES payload 41a-2 includes the data of a single picture. An elementary stream is made up of those PES payloads 41a-2. Portion (c) of FIG. 5 shows the data structure of an elementary stream (ES) 42. The ES 42 includes multiple pairs of picture headers and picture data. It should be noted that the "picture" is generally used as a term that may refer to either a frame or a field.

In the picture header 42a shown in portion (c) of FIG. 5, a picture coding type, showing the picture type of picture data 42b that follows, is described. A picture coding type, showing the picture type of picture data 42d, is described in the picture header 42c. The "type" is one of an I-picture (intra-coded picture), a P-picture (predictive-coded picture) and a B-picture (bidirectionally-predictive-coded picture). If the type shows this is an I-picture, its picture coding type may be "001b", for example.

The picture data 42b, 42d, etc. is data corresponding to a single frame, which may consist of either that data only or that data and preceding/succeeding data to be decoded before and/or after the former data. For example, portion (d) of FIG. 5 shows a picture 43a consisting of the picture data 42b and a picture 43b consisting of the picture data 42d.

In playing back video based on a TS, the camcorder 100 gets video TS packets and extracts picture data by the processing described above, thereby getting pictures as components of video. As a result, the video can be presented on the LCD 209a.

As far as a video content is concerned, the encoder 203 may be regarded as generating a TS in the order shown in portions (d), (c), (b) and (a) of FIG. 5.

Next, the TS processing section 204 of the camcorder 100 (see FIG. 2) will be described. The TS processing section 204 receives the TS from the encoder 203 in recording moving pictures or from the digital tuner 201c in recording a digital broadcast, and generates a clip AV stream. The clip AV stream is a data stream, the format of which is suitable for recording it on the removable HDD 112a, for example. In this preferred embodiment, an extension TTS, meaning "Timed TS", is added to a clip AV stream file stored on a removable HDD. The clip AV stream is implemented as a TS with arrival time information. In playing back a content, the TS processing section 204 receives the clip AV stream, which has been read out from the removable HDD 112a, for example, from the media control section 205, generates a TS from the clip AV stream, and outputs it to the MPEG-2 decoder 206.

Hereinafter, a clip AV stream, relevant to the processing done by the TS processing section 204, will be described with reference to FIG. 6, which shows the data structure of a clip AV stream 60. The clip AV stream 60 includes a plurality of TTS packets 61, each of which consists of a TTS header 61a of 4 bytes and a TS packet 61b of 188 bytes. That is to say, each TTS packet 61 is generated by adding the TTS header 61a to the TS packet 61b. It should be noted that the TS packet 61b is the TS packet that has already been described with reference to FIGS. 3, 4(a) and 4(b).

The TTS header 61a consists of a reserved area 61a-1 of 2 bits and an arrival time stamp (ATS) 61a-2 of 30 bits. The arrival time stamp 61a-2 shows the time when the TS packet supplied from the encoder 203 arrived at the TS processing section 204. At the specified time, the TS processing section 204 outputs the TS packet to the decoder 206.

Next, the configuration of the TS processing section 204 that generates the clip AV stream 60 will be described. FIG. 7 shows an arrangement of functional blocks for the TS processing section 204, which includes a TTS header adding section 261, a clock counter 262, a PLL circuit 263, a buffer 264 and a TTS header removing section 265.

The TTS header adding section 261 receives a TS, adds a TTS header to the top of each of TS packets that form the TS, and outputs them as TTS packets. The arrival time of the TS packet described in the arrival time stamp 61a-2 in the TTS header can be known by reference to the count value (i.e., count information) from the reference time as provided for the TTS header adding section 261.

The clock counter 262 and PLL circuit 263 generate information that is needed for the TTS header adding section 261 to find the arrival time of the TS packet. First, the PLL circuit 263 extracts a PCR packet (e.g., PCR_TSP shown in FIG. 2) from the TS to get a program clock reference (PCR) showing the reference time. The same value as the PCR value is set as a system time clock (STC) of the camcorder 100, which is used as the reference time. The system time clock STC has a system clock with a frequency of 27 MHz. The PLL circuit 263 outputs a 27 MHz clock signal to the clock counter 262. On receiving the clock signal, the clock counter 262 outputs the clock signal as the count information to the TTS header adding section 261.

The buffer 264 includes a write buffer 264a and a read buffer 264b. The write buffer 264a sequentially retains incoming TTS packets and outputs them all together to the media control section 205 (to be described later) when the total data size reaches a predetermined value (which may be the maximum storage capacity of the buffer, for example). series of TTS packets (or data stream) output at this time is called a "clip AV stream". On the other hand, the read buffer 264b temporarily buffers the clip AV stream that has been read by the media control section 205 from the removable HDD 112a, for example, and outputs the stream on a TTS packet basis.

The TTS header removing section 265 receives TTS packets, converts the TTS packets into TS packets by removing the TTS headers from the packets, and outputs them as a TS. It should be noted that the TTS header removing section 265 extracts the arrival time stamp ATS of the TS packet included in the TTS header, and outputs the TS packets at a timing (or at time intervals) associated with the original arrival time by reference to the arrival time stamp ATS and the timing information provided by the clock counter 262. The removable HDD 112a, etc. is randomly accessible, and data is arranged discontinuously on the disk. That is why by reference to the arrival time stamp ATS of a TS packet, the TS processing section 204 can output the TS packet at the same time as the arrival time of the TS packet during recording, no matter where the data is stored. To specify the reference time of the TS read, the TTS header removing section 265 sends the arrival time, which is specified in the first TTS packet, for example, as an initial value to the clock counter 262. In response, the clock counter 262 can start counting from that initial value and the results of counting after that may be received as timing information.

The camcorder 100 is supposed to include the TS processing section 204 for generating a clip AV stream by adding TTS headers to a TS. However, in encoding a stream at a constant bit rate (CBR) (i.e., at a fixed encoding rate), the TS packets are input to the decoder at regular intervals. In that case, the TS may be written on the removable HDD 112 with the TS processing section 204 omitted.

Referring back to FIG. 2, the other components of the camcorder 100 will be described.

The media control section 205 receives a clip AV stream from the TS processing section 204, decides which removable HDD 112a, 112b, . . . or 112c the stream should go to, and outputs it to that removable HDD. Also, the media control section 205 monitors the remaining storage space of the removable HDD on which writing is being carried out. When the remaining space becomes equal to or smaller than a predetermined value, the media control section 205 changes the destinations into another removable HDD and goes on to output the clip AV stream. In that case, the clip AV stream representing a single content will be split into two parts to be stored in two removable HDDs 112, respectively.

The media control section 205 generates a clip time line (ClipTimeLine) table, which constitutes one of the principal features of the present invention, and describes, in that table, a flag showing whether or not a key picture unit, which is the playback unit of the clip AV stream, is stored in two files separately. A more detailed operation of the media control section 205 and a detailed data structure of the clip time line table generated by the media control section 205 will be described later.

It should be noted that the processing of writing the clip AV stream on the removable HDD 112 is carried out by the removable HDD 112 itself on receiving a write instruction and the clip AV stream from the media control section 205. On the other hand, the processing of reading the clip AV stream is also carried out by the removable HDD 112 itself in response to a read instruction given by the media control section 205. In the following description, however, the media control section 205 is supposed to read and write the clip AV stream for the sake of convenience.

The MPEG-2 decoder 206 (which will be simply referred to herein as a "decoder 206") analyzes the TS supplied to get compression-encoded video and audio data from TS packets. Then, the decoder 206 expands the compression-encoded video data, converts it into decompressed data and then passes it to the graphic control section 207. The decoder 206 also expands the compression-encoded audio data to generate an audio signal and then passes it to the loudspeaker 209b. The decoder 206 is designed so as to satisfy the system target decoder (T-STD) requirements defined by an MPEG standard about TS.

The graphic control section 207 is connected to the internal computer memory 208 and realizes an on-screen display (OSD) function. For example, the graphic control section 207 may combine any of various menu pictures with video and output the resultant synthetic video signal. The liquid crystal display (LCD) 209a presents the video signal supplied from the graphic control section 207 on an LCD. The loudspeaker 209b outputs the audio signal as audio. The content is played back for viewing on the LCD 209a and listening to through the loudspeaker 209b. It should be noted that the video and audio signal do not have to be output to the LCD 209a and the loudspeaker 209b, respectively. Alternatively, the video and audio signals may be transmitted to a TV set and/or a loudspeaker, which are external devices for the camcorder 100, by way of external output terminals (not shown).

The CPU bus 213 is a path for transferring signals in the camcorder 100 and is connected to the respective functional blocks as shown in FIG. 2. In addition, the respective components of the system control section 250 to be described later are also connected to the CPU bus 213.

The network control section 214 is an interface for connecting the camcorder 100 to the network 101 such as the Internet and is a terminal and a controller that are compliant with the Ethernet™ standard, for example. The network control section 214 exchanges data over the network 101. For example, the network control section 214 may transmit the captured and generated clip AV stream to a broadcaster over the network 101. Or when a software program that controls the operation of the camcorder 100 is updated, the network control section 214 may receive the updated program over the network 101.

The instruction receiving section 215 may be an operating button arranged on the body of the camcorder 100. The instruction receiving section 215 receives a user's instruction to start or stop a recording or playback operation, for example.

The interface (I/F) section 216 controls the connector for use to allow the camcorder 100 to communicate with other devices and also controls the communications themselves. The I/F section 216 includes a terminal compliant with the USB 2.0 standard, a terminal compliant with the IEEE 1394 standard, and a controller for enabling data communications according to any of these various standards and can exchange data according to a method that complies with any of these standards. For example, the camcorder 100 may be connected to the PC 108, another camcorder (not shown), a BD/DVD recorder or another PC by way of the USB 2.0 terminal or the IEEE 1394 terminal.

The system control section 250 controls the overall processing of the camcorder 100 including the signal flows there and includes a program ROM 210, a CPU 211 and a RAM 212, all of which are connected to the CPU bus 213. A software program for controlling the camcorder 100 is stored in the program ROM 210.

The CPU 211 is a central processing unit for controlling the overall operation of the camcorder 100. By reading and executing a program, the CPU 211 generates a control signal to realize the processing defined by the program and outputs the control signal to the respective components over the CPU bus 213. The memory 212 has a work area for storing data that is needed for the CPU 211 to execute the program. For example, the CPU 211 reads out a program from the program ROM 210 and outputs it to the random access memory (RAM) 212 through the CPU bus 213 and executes the program. The computer program may be circulated on the market by being stored on a storage medium such as a CD-ROM or downloaded over telecommunications lines such as the Internet. As a result, a computer system that is made up of a PC, a camera, a microphone and so on can also operate as a device having functions that are equivalent to those of the camcorder 100 of this preferred embodiment. Such a device will also be referred to herein as a "data processor".

Next, the data management structure of a content, captured with the camcorder 100 and including audio and video, will be described with reference to portions (a), (b) and (c) of FIG. 8. Portion (a) of FIG. 8 shows the concept of a single content according to this preferred embodiment. Specifically, a content that has been captured from the beginning and through the end of a video recording session will be referred to herein as "one shot". Portion (b) of FIG. 8 shows the concept of clips, each including the management information of the content and stream data. One shot (i.e., a single content) may be stored as a plurality of clips a, b and c in respective removable HDDs 112a, 112b and 112c. Alternatively, the content may be complete within a single clip. Each clip includes clip meta-data 81, a time map 82 and a portion of the clip AV stream 83 (i.e., a partial stream). The clip AV stream 83 consists of partial streams 83a, 83b and 83c, which are included in the clips a, b and c, respectively. Portion (b) of FIG. 8 shows the three clips a, b and c. However, as all of these clips have the same configuration, only the clip a will be described as an example.

The clip a includes clip meta-data a, a time map a and a partial stream a. The clip meta-data a and the time map a are pieces of management information, while the partial stream a is data that forms a part of the clip AV stream 83. As a matter of principle, the clip AV stream 83 is stored in a single file. However, if the size of the stream exceeds the maximum permissible file size according to the FAT 32, the stream is stored in multiple TTS files. In Portion (b) of FIG. 8, the three partial streams 83a, 83b and 83c are stored in three different files. According to this preferred embodiment, if the files sizes of the respective partial streams were equal to the maximum permissible file size (of 4 gigabytes) according to the FAT 32 file system, then no spaces would be left in any of the removable HDDs 112a, 112b and 112c and the management information could not be written on the removable HDDs 112 anymore. That is why the file sizes of the respective partial streams should be less than 4 gigabytes. Furthermore, the TTS file may be supposed to include an integral number of TTS packets and have a size that is less than 4 gigabytes, which is the maximum permissible size according to the file system, and that is an integral number of times as large as the size of a TTS packet (of 192 bytes).

The clip meta-data a is described in the XML format and defines information that is required to play back a content (such as the video and/or audio format(s)). The clip meta-data a will be described in further detail later with reference to FIG. 10.

The time map a is a table that defines correspondence between the presentation times and their storage locations (addresses) on a playback unit basis. This time map will be referred to herein as a "clip time line (ClipTimeLine)" and a file that stores the clip time line is shown with an extension "CTL". The clip time line will be described in detail later with reference to FIGS. 12 through 14.

The partial stream a is made up of a plurality of TTS packets as shown in FIG. 6.

It should be noted that if the clip AV stream 83 gets stored in files for multiple partial streams 83a, 83b and 83c during one shot, then the ATS clock counter 262 (see FIG. 7) that determines the transfer timings of the TS packets is never reset and never has a value that has nothing to do with its previous count value. The clock counter 262 (see FIG. 7) continues counting with respect to the predetermined reference time, thereby outputting a count value. That is why the arrival time stamps ATS of the respective TTS packets that form the clip AV stream 83 are continuous with each other at each boundary between two consecutive ones of the TTS files that form one shot.

Portion (c) of FIG. 8 shows three removable HDDs 112a, 112b and 112c. The data files of the respective clips a, b and c are written on the respective removable HDDs 112a, 112b and 112c, respectively.

Next, it will be described how the files are stored in the removable HDD 112. FIG. 9 shows the hierarchical directory structure in the removable HDD 112. The content's management information and the clip AV stream files are stored in the Contents folder 91 in the ROOT 90 on the uppermost layer and on lower layers. More specifically, in the Database folder 92 right under the Contents folder 91, stored are an XML format file containing the clip meta-data 94 as a piece of management information and a CTL format file of the clip time line 95. On the other hand, in the TTS folder 93 right under the Contents folder 91, stored is a TTS format file of the clip AV stream (Timed TS) 96.

Optionally, the Contents folder 91 may further include a Video folder to store video stream data in the MXF format, an Audio folder to store audio stream data in the MXF format, an Icon folder to store thumbnail pictures in the BMP format, and a Voice folder to store voice memo data in the WAVE format. These additional folders may be adapted to the current recording formats of camcorders.

Next, the contents of the data included in the clip meta-data 94 and clip time line 95 will be described with reference to FIGS. 10 through 14.

FIG. 10 shows the contents of information included in the clip meta-data 94, which is classified into the two types of data: "Structural" data and "Descriptive" data.

The "Structural" data includes descriptions of clip name, essence list and relation information. The clip name is a piece of information that identifies the given file and a known unique material identifier (UMID) may be described as the clip name, for example. The UMID may be generated as a combination of the time when the content was produced and the media access control (MAC) address of the device that produced it. Furthermore, the UMID is also generated in view of whether the content has been newly produced or not. That is to say, if a content has been given a UMID once but has been edited or processed after that, a different value from the UMID of the original content is added to that content. That is why if UMIDs are used, mutually different values can be defined for all sorts of contents around the world, and therefore, any content can be identified uniquely.

The essence list includes descriptions of information that is required to decode video and audio (i.e., video information and audio information). For example, the video information includes descriptions of the format, compression coding method and frame rate of video data, while the audio information includes descriptions of the format and sampling rate of audio data. In this preferred embodiment, the compression coding method is compliant with the MPEG-2 standard.

The relation information defines a relation between clips in a situation where there are a number of clips 81a to 81c as in portion (b) of FIG. 8. More specifically, each clip meta-data 94 provides a description of the information that identifies the first clip of that shot, i.e., pieces of information that identify the previous clip and the next clip, respectively. That is to say, the relation information may be regarded as defining in what order the clip AV stream (or the partial stream), consisting of those clips, should be presented, i.e., the presentation order of the clip AV stream. The information identifying a clip may be defined as an UMID and a unique serial number of that removable HDD 112.

The Descriptive data includes access information, device information, shooting information, and presentation information. The access information includes descriptions of the person who updated the clip last time and the date of the update. The device information includes descriptions of the name of the manufacturer and the serial number and the model of the recorder. The shooting information includes the name of the shooter, the shooting start date and time, the end date and time, and the location. The presentation information specifies the presentation start time, the playback duration and so on.

Next, the clip time line 95 will be described. The clip time line 95 introduces the concepts of "key pictures" and "key picture unit" and defines information about these new concepts. Thus, first, it will be described with reference to FIG. 11 what the key pictures and the key picture unit are.

FIG. 11 shows a relation between key pictures and a key picture unit. In FIG. 11, I-, B- and P-pictures are shown in their presentation order. A key picture unit (KPU) is a data presentation unit that is defined about video. In the example shown in FIG. 11, the presentation of the key picture unit KPU begins with a key picture 44 and ends with a B-picture 45. At least one group of pictures (GOP) compliant with the MPEG standard is interposed between the two pictures. The presentation of the next key picture unit KPU begins with the I-picture 46 that follows the B-picture 45. Each key picture unit has a video playback duration of 0.4 seconds to 1 second. However, the last key picture unit of one shot may have a duration of 1 second or less. This is because the duration could be less than 0.4 seconds depending on the end time of the shooting. In this example, the presentation is supposed to begin with an I-picture at the top of a GOP. However, the present invention is in no way limited to this specific example but the presentation may also begin with a B-picture according to a GOP structure. This is because the KPU period shows the overall playback duration of all pictures included in that KPU.

The key pictures 44 and 46 located at the respective tops of the key picture units are access units about video, including sequence_header_code and group_start_code compliant with the MPEG standard. For example, the key picture unit may be either the image of an MPEG-2 compressed and encoded I-picture (which may be either an image frame or a set of two image fields) or the image of a compressed and encoded I- or P-field.

Also, according to this preferred embodiment, the KPU period is defined by using PTS added to a TS. Specifically, the KPU period is the difference between the presentation time stamp (PTS) of the picture to be presented first in the next key picture unit KPU and that of the picture to be presented first in the current KPU. In FIG. 11, if the presentation time stamps of the key pictures 44 and 46 are supposed to be PTS(N) and PTS(N+1), respectively, then the KPU period (N) is defined as PTS(N+1)-PTS(N) in a situation where both key pictures are presentation start pictures. As is clear from the definition of the KPU period, to define the length of a KPU period, the pictures of the next key picture unit KPU need to be compressed and encoded and the presentation time stamp PTS of the first picture to be presented needs to be fixed. That is why the KPU period of a key picture unit KPU is not fixed until the next key picture unit starts to be generated. It should be noted, however, that the last KPU period of one shot sometimes needs to be figured out. Therefore, a method of summing up the playback durations of the pictures encoded may also be adopted. In that case, the KPU period may be determined even before the next KPU starts to be generated.

Next, the clip time line (ClipTimeLine) will be described with reference to portions (a), (b) and (c) of FIG. 12. Portion (a) of FIG. 12 shows the data structure of the clip time line (ClipTimeLine) 95. The clip time line 95 is written as a file with an extension CTL on each removable HDD 112.

The clip time line 95 is a table defining a relation between the presentation time of each playback unit and its storage location (i.e., the address). The "playback unit" corresponds to the key picture unit KPU described above.

A number of fields are defined for the clip time line 95. For example, the clip time line 95 may include a TimeEntryNumber field 95a, a KPUEntryNumber field 95b, ClipTimeLineTimeOffset field 95c, a ClipTimeLineAddressOffset field 95d, a ClipTimeLineDuration field 95e, a StartSTC field 95f, a TimeEntry field 95g and a KPUEntry field 95h, for example. A predetermined number of bytes are allocated to each of these fields to define a particular meaning by its value.

For example, the TimeEntryNumber field 95a may describe the number of time entries and the KPUEntryNumber field 95b may describe the number of KPU entries. However, the data sizes of the TimeEntry field 95g and KPUEntry field 95h are variable with the number of time entries and the number of KPU entries, respectively, as will be described later.

Portion (b) of FIG. 12 shows the data structure of the TimeEntry field 95g for one time entry. In the TimeEntry field 95g, pieces of information showing the properties of its associated time entry are described in a plurality of fields including a KPUEntryReferenceID field 97a, a KPUEntryStartAddress field 97b and TimeEntryTimeOffset field 97c.

On the other hand, portion (c) of FIG. 12 shows the data structure of the KPUEntry field 95h for one KPU entry. In the KPUEntry field 95h, pieces of information showing the properties of its associated key picture unit KPU are described in a plurality of fields including an OverlappedKPUFlag field 98a, a KeyPictureSize field 98b, a KPUPeriod field 98c and a KPUSize field 98d.

Hereinafter, the meanings of the data defined in main fields of the clip time line 95 will be described with reference to FIGS. 13(a) and 13(b).

FIG. 13(a) shows a relation between the time entries and fields included in the clip time line 95. In FIG. 13(a), one scale on the axis of abscissas represents one access unit time (AUTM), which corresponds to the playback duration of one picture. In this case, the type of the "picture" changes with the type of the video in question. More specifically, the "picture"

corresponds to a single progressive scan image frame in progressive video and to a single interlaced scan image field (i.e., a single field) in interlaced video, respectively. For example, in progressive video to be presented at intervals of 24000/1001 seconds (i.e., 23.97 p), 1 AUTM may be represented as 1/(24000/1001) seconds=1126125 clocks/27 MHz.

First, the timing relation in a situation where a number n of clips are included in one shot will be described. The playback duration of each clip is described in the ClipTimeLineDuration field 95e. This value may be described using the AUTM. By calculating the sum of the values in the ClipTimeLineDuration fields 95e of all clips, the playback duration of one shot (i.e., shooting time length) can be obtained as represented by the following Equation (1):

$$\text{Playback duration of one shot} = \Sigma \text{ClipTimeLineDuration} \tag{1}$$

This time length may also be described using the AUTM.

On the other hand, supposing KPU #0 through KPU #(k+1) shown in FIG. 13(a) are included in one clip, the ClipTimeLine Duration field 95e of each clip is obtained as the sum of the KPUPeriod fields 98c of all key picture units KPU included in that clip as represented by the following Equation (2):

$$\text{ClipTimeLineDuration} = \Sigma \text{KPUPeriod} \tag{2}$$

Since the KPUPeriod is described using the AUTM value, the ClipTimeLineDuration field 95e is also described using the AUTM value.

The value of each KPUPeriod field 98c corresponds with the sum of the video playback durations (i.e., the AUTM values) of the pictures included in that key picture unit KPU as described above (and as represented by the following Equation (3):

$$\text{KPUPeriod} = \text{overall playback duration of all video in KPU} \tag{3}$$

The TimeEntry refers to discrete points on the time axis, which are set at regular intervals (of 5 seconds, for example) and at any of which playback can be started. In setting the time entries, if the presentation start time of the first key picture unit KPU #0 is supposed to be zero, the time offset to the TimeEntry #0 that has been set for the first time is defined as the ClipTimeLineTimeOffset field 95c. Also, a piece of information that identifies the key picture unit KPU to be presented at the set time of each time entry is described in the KPUEntryReferenceID field 97a. And a piece of information showing a time offset from the beginning of the key picture unit KPU through the set time of the time entry is described in the TimeEntryTimeOffset field 97c.

For example, if TimeEntry #t is specified, the time at which the TimeEntry #t is set (i.e., the amount of time that has passed since the beginning of the first key picture unit KPU #0) can be obtained by calculating (the value of ClipTimeLineTimeOffset field 95c)+(the interval of time entries·t).

Alternatively, presentation may also be started at any presentation time by the following method. Specifically, when a requested presentation start time is received from the user, that time is converted by known conversion processing into a PTS value, which is a piece of time information compliant with the MPEG standard. Then, the presentation is started from the picture to which the PTS value is allocated. It should be noted that the PTS value is described in the transport packet header 30a in the video TS packet (V_TSP) 30 (see FIG. 4(a)).

In this preferred embodiment, a single clip AV stream is split into multiple partial streams. That is why not every partial stream within a clip has a presentation time stamp PTS of zero at the top. Thus, in the StartSTC field 95f of the clip time line 95 (see portion (a) of FIG. 12), the presentation time stamp PTS of the picture to be presented first in the top KPU within the clip is described. And based on the PTS value of that picture and that associated with the specified time, a PTS (AUTM) differential value through the picture where presentation should be started can be obtained. It should be noted that the data size of the PTS value allocated to each picture is preferably equal to that of the PTS value defined for the StartSTC field 95f (e.g., 33 bits).

If the differential value is greater than the value of the ClipTimeLineDuration field 95e, then it can be determined that the picture to start presentation at will not be present within the clip. On the other hand, if the differential value is smaller than the value of the ClipTimeLineDuration field 95e, then it can be determined that the picture to start presentation at will be present within the clip. In the latter case, it can be further determined easily, by that PTS differential value, how distant that time is.

FIG. 13(b) shows a relation between the KPU entries and fields included in the clip time line 95. In FIG. 13(b), one scale on the axis of abscissas represents one data unit length (timed TS packet byte length (TPBL)), which means that one data unit is equal to the data size of a TTS packet (of 192 bytes).

A single KPU entry is provided for each key picture unit KPU. In setting the KPU entries, the data size of each KPU is described in the KPUSize field 98d and the start address of the KPU associated with each time entry is described in the KPUEntryStartAddress field 97b. As shown in KPUSize #k in FIG. 13(b), for example, the data size of each key picture unit KPU is represented on the basis of data unit lengths (TPBL) as a data size from the first TTS packet that stores the data of the first picture in the KPU through a TTS packet just before the TTS packet that stores the first picture of the next KPU.

Furthermore, in the KPU entry, a fragment from the beginning of the file through the top of the key picture unit KPU #0 (i.e., a data offset) is set in the ClipTimeLineAddress Offset field 95d. This field is provided for the following reason. Specifically, if the data of a clip AV stream for one shot is stored separately in multiple files, a portion of the KPU at the end of the previous file may be stored at the top of the second file and so on. Decoding of respective pictures in the key picture unit KPU needs to begin with the key picture at the top of the KPU. That is why the data located at the beginning of a file cannot be decoded by itself. Therefore, such data needs to be skipped as meaningless data (i.e., the fragment). Consequently, skip is enabled by using that offset value in the offset field 95d described above.

Hereinafter, the OverlappedKPUFlag field 98a in a situation where the data of a clip AV stream for one shot has been stored separately in multiple files will be described with reference to FIG. 14. In the following example, the management information and clip AV stream of a content for one shot are supposed to be stored in two removable HDDs #1 and #2 and the clip meta-data will not be mentioned for the sake of simplicity.

FIG. 14 shows the management information and clip AV stream of a content for one shot that are stored in two removable HDDs. In the removable HDDs #1 and #2, clip time line files 00001.CTL and 00002.CTL and clip AV stream files 00001.TTS and 00002.TTS are stored, respectively.

The following description will be focused on the KPU entries. Firstly, the KPU Entry #(d-1) on the removable HDD #1 is provided for the key picture unit KPU #(d-1) that is defined for the clip AV stream within the TTS. As shown in FIG. 14, every data of the key picture unit KPU #(d-1) is included within the 00001.TTS. In that case, 0b is set for the OverlappedKPUFlag field 98*a* in the KPU Entry #(d-1).

Next, look at the KPU Entry #d and its associated key picture unit KPU #d. A portion of the key picture unit KPU #d shown in FIG. 14 (i.e., key picture unit KPU #d1) is included within 00001.TTS of the removable HDD #1, while the other portion of the key picture unit KPU #d (i.e., key picture unit KPU #d2) is included within 00002.TTS of the removable HDD #2. The key picture unit KPU #d is separately stored in two removable HDDs because the remaining storage space became less than a predetermined value during writing on the removable HDD #1 and writing could not be performed anymore, for example. In that case, 1b is set in the OverlappedKPUFlag field 98*a* of the KPU entry #d.

On the other hand, every data of the key picture unit KPU associated with the KPU Entry #0 within the removable HDD #2 is stored within that removable HDD. That is why 0b is set in its OverlappedKPUFlag field 98*a*.

As described above, by checking the value of the OverlappedKPUFlag field 98*a* within the KPU Entry, it can be determined whether or not the key picture unit KPU is stored within the file of that medium. This will be very advantageous in the following type of processing, for example.

If the data of the KPU #d is stored separately in multiple TTS files (00001.TTS and 00002.TTS) as shown in FIG. 14, editing processing of deleting all data from the removable HDD #2 is supposed to be carried out. By performing such editing processing, the one shot playback is carried out based on only the data that is stored on the removable HDD #1.

As a result of the editing processing, the playback duration of the one shot changes. That is why an accurate playback duration needs be calculated. Thus, the processing of figuring out the playback duration can be changed according to the value in the OverlappedKPUFlag field 98*a*.

Hereinafter, (1) the processing of calculating playback duration through a picture that should be able to be played back, and (2) the processing of calculating playback duration through a picture that can be actually played back will be described. The processing program (1) will be installed in a device for general users, while the processing program (2) will be installed in a device for business users.

First, the processing method (1) will be described. As for the last KPU #d in the removable HDD #1 that has already been subjected to the editing processing, the value in the OverlappedKPUFlag field 98*a* is 1b. In that case, the sum of the KPUPeriods from the top through the KPU #(d-1) is adopted as the clip playback duration (ClipTimeLineDuration 95*e*) within the removable HDD #1. In other words, the KPUPeriod value of the key picture unit KPU #d is not counted in calculating the clip playback duration by Equation (2) described above. This is because an error corresponding to the playback duration of the last KPU #d (of 0.4 seconds to 1 second) could be produced between the actual playback duration (from the first KPU through KPU #(d-1)) and the one shot playback duration calculated by Equation (2) (from the first KPU through KPU #d). According to this calculating method, the playback duration of video that should be able to be played back for sure can be known.

Next, the processing method (2) will be described. According to the processing method (1), the playback duration of KPU #d1 including data is not taken into account. However, some pictures can be played back based on the data included in KPU #d1. That is why the playback duration calculated by the processing method (1) may contain errors, strictly speaking. In some cases, devices for business use and for special purposes may not permit the playback duration, presented by the device, to contain such errors. For that reason, if the value in the OverlappedKPUFlag field 98*a* is 1b, the video playback duration, for which playback can be carried out on a frame or field basis, may be calculated by analyzing KPU #d1. By adding the playback duration to that calculated by the processing method (1), the playback duration of the clip can be calculated very accurately.

If the value in the OverlappedKPUFlag field 98*a* associated with the last KPU within the removable HDD #1 is 0b, then the sum of the KPU periods (KPUPeriod) of the first through the last key picture units may be adopted as the value of the ClipTimeLineDuration 95*e*. This is because as all pictures within the last key picture unit KPU can be played back, the KPUPeriod of that KPU needs to be calculated as a part of the ClipTimeLineDuration 95*e*.

As described above, by changing the types of processing of calculating the ClipTimeLineDuration 95*e* according to the value of the OverlappedKPUFlag field 98*e*, the playback duration can always be calculated accurately.

Optionally, it may be determined by reference to the value of the OverlappedKPUFlag field 98*e* whether or not to delete an imperfect key picture unit KPU and if the key picture unit is deleted, the clip time line may be modified for the remaining clips. As used herein, the "imperfect key picture unit" refers to a key picture unit not including the data of every picture. In this example, KPU #d without KPU #d2 is an imperfect key picture unit.

More specifically, if the value of the OverlappedKPUFlag field 98*a* is 1b, the imperfect key picture unit KPU #d1 may be deleted from the TTS file so as not to be treated as a key picture unit KPU and the clip time line within the removable HDD #1 may be modified. Modification of the clip time line includes decreasing the number of key picture units KPU (i.e., the KPUEntryNumber 95*b*), deleting the KPUEntry of KPU #d, and deleting the TimeEntry 95*g* within the key picture unit KPU #d1. As a result of the modification, the last key picture unit of the 00001.TTS file of the removable HDD #1 is KPU #(d-1) and the sum of the playback durations of the first KPU through the last KPU #(d-1) becomes the playback duration of one shot. Consequently, an accurate playback duration can be obtained by applying Equations (1) to (3) uniformly. It should be noted that such a latter half deletion could also be done on a TTS packet (192 bytes) basis even on a FAT32 file system.

Also, the key picture unit KPU #d2 is just a fragment within the removable HDD #2 and video cannot be decoded only with its data. That is why the fragment (data offset) from the beginning of the clip AV stream file (00002.TTS) within the removable HDD #2 through the top of the key picture unit KPU #0 is defined as the ClipTimeLineAddressOffset field 95*d*. Furthermore, the time offset from the top of that key picture unit KPU #0 through the first TimeEntry #0 is defined as the ClipTimeLineTimeOffset field 95*c*. It should be noted that unless the value of the ClipTimeLineAddressOffset field 95*d* is zero, it means that the key picture unit KPU of the previous removable HDD is stored. That is why in performing a rewind playback operation, it may be determined by reference to the relation information of the clip meta-data 94 whether or not there is the previous clip. If no previous clip is present or accessible, then the rewind playback operation ends. If a previous clip halfway through a shot is accessible, it may be checked whether the value of the ClipTimeLineAddressOffset field 95*d* is zero or not. If the value is not zero, the value of the OverlappedKPUFlag field 98*a* of the KPU entry associated with the last key picture unit KPU of the previous removable HDD is further checked to determine whether or not the key picture unit KPU has been split into the two files.

Hereinafter, the processing of recording and playing back a content based on such a data structure will be described first, and then the processing of editing such a content will be described.

First, the (recording) processing that should be done by the camcorder 100 to record a content on a removable HDD will be described with reference to FIGS. 15 and 16.

FIG. 15 shows the procedure of the content recording processing to be done by the camcorder 100. First, in Step S151, the CPU 211 of the camcorder 100 receives a user's instruction to start shooting by way of the instruction receiving section 215. Next, in Step S512, in accordance with the instruction given by the CPU 211, the encoder 203 generates a TS based on the input signal. Alternatively, in recording a digital broadcast, an instruction to record may be received in Step S151 and TS packets representing the program to be recorded may be extracted by using the digital tuner 201c in Step S152.

In Step S153, the media control section 205 sequentially writes the TS (clip AV stream), to which the TTS headers have been added by the TS processing section 204, onto a removable HDD. Then, in Step S154, the media control section 205 determines whether or not to newly generate a clip (TTS file). The clip may or may not be generated arbitrary depending on whether or not the TTS file size of the clip being recorded is greater than a predetermined value or on the remaining space of the removable HDD. If no clips are generated newly, the process advances to Step S155. On the other hand, if a clip needs to be generated newly, the process advances to Step S156.

In Step S155, every time a key picture unit KPU is generated, the TS processing section 204 generates a KPU entry and a time entry. In this processing step, all data of the key picture unit KPU is written on the TTS file of that clip. Thus, the media control section 205 sets 0b in the OverlappedKPU-Flag field in the KPU entry. Then, in Step S157, the media control section 205 writes a time-address conversion table (ClipTimeLine) including KPU entries and time entries on the removable medium. Thereafter, in Step S158, the CPU 211 determines whether or not to finish shooting. The shooting ends if an instruction to finish shooting has been received by way of the instruction receiving section 215 or if there is no removable HDD to write the data on. If it is determined that the shooting should end, the recording processing ends. On the other hand, if the shooting should be continued, the process goes back to Step S152 to repeat the same processing steps all over again.

On the other hand, in Step S156, the TS processing section 204 determines whether or not the key picture unit KPU is completed with the data that has been written last time. If the key picture unit KPU were incomplete, the remaining data of the key picture unit KPU would be stored in another removable HDD. For that reason, such a decision should be made to determine whether or not all data of the key picture unit KPU has been written in the removable HDD. If the key picture unit KPU is complete, the process advances to Step S155. Otherwise, the process advances to Step S159.

In Step S159, the TS processing section 204 performs clip switching processing, the details of which are shown in FIG. 16.

FIG. 16 shows the procedure of the clip switching processing, which is the processing of either changing the target media on which the content (clip) should be recorded from one removable HDD into another or generating a new clip on the same removable HDD. In the following example, switching the clips is supposed to be changing the target media on which the content should be recorded for the sake of simplicity. However, this is essentially the same as a situation where the content is recorded in a new clip on the same storage medium. Also, for convenience sake, the removable HDD on which the content has been recorded so far will be referred to herein as a "first removable HDD" and the removable HDD on which that content goes on to be recorded next will be referred to herein as a "second removable HDD".

First, in Step S161, the CPU 211 gives a clip name to the clip to be generated on the second removable HDD. Next, in Step S162, the camcorder 100 continues to generate the TS until the key picture unit KPU that could not be recorded completely on the first removable HDD is completed. Then, the TS processing section 204 adds a TTS header and the media control section 205 writes that clip AV stream on the second removable HDD.

Next, in Step S163, the media control section 205 generates the KPU entry and time entry of the completed KPU. As the key picture unit KPU is written on the first and second removable HDDs separately in this case, the media control section 205 sets 1b in the OverlappedKPUFlag field in the KPU entry.

Subsequently, in Step S164, the media control section 205 writes a time-address conversion table (ClipTimeLine), including the KPU and time entries generated, on the first removable HDD. Then, in Step S165, the media control section 205 updates the clip meta-data (such as the relation information) on the first removable HDD. For example, the media control section 205 may write a UMID, identifying a clip on the second removable HDD as the next clip, on the clip meta-data of the clip on the first removable HDD. Also, the media control section 205 may write a UMID, identifying a clip on the first removable HDD as the previous clip, on the clip meta-data of the clip on the second removable HDD. Thereafter, in Step S166, the media control section 205 sets the target on which the content will be written as the second removable HDD to end the processing.

Hereinafter, the processing to be done by the camcorder 100 to play back a content from a removable HDD, more specifically, the processing of playing back a content from a location associated with a presentation start time specified, will be described with reference to FIG. 17. It should be noted that the processing of playing back a content from the beginning is the same as the conventional processing that uses no KPU entries or time entries and the description thereof will be omitted herein.

FIG. 17 shows the procedure of content playback processing to be done by the camcorder 100. First, in Step S171, the CPU 211 of the camcorder 100 receives a user's specified presentation start time by way of the instruction receiving section 215.

Next, in Step S172, the media control section 205 reads a time-address conversion table (ClipTimeLine) and the CPU 211 identifies a key picture unit KPU including a picture at the presentation start time. Then, in Step S173, the CPU 211 locates the start point of the KPU associated with the presentation start time. This KPU start point represents a decoding start position (address) within the TTS file.

These processing steps may be performed as follows. Specifically, the CPU 211 finds that the presentation start time is between the time entries #t and #(t+1) and calculates how many units there are between the processing start time and the time entry #t on the basis of m access unit times (AUTMs).

Specifically, first, by reference to the value of the KPUEntryReferenceID field 97a of TimeEntry #t, a KPU (which will be referred to herein as "KPU #k") is identified. Then, the time difference between the time specified by the TimeEntry #t and the time when the first key picture of the KPU #k starts to be presented is gotten based on the value of the TimeEntryTimeOffset field 97c. As a result, it turns out in how many AUTMs the picture to start presentation with will come up as counted from the picture that has been presented first in the KPU #k. Then, by adding the KPUPeriods every KPU from the KPU #k, a KPU including the picture to start presentation with can be identified. Also, by adding together the KPUSizes from the KPU #k through the KPU that precedes the KPU including the picture to start presentation with at the top address of the KPU as specified by the TimeEntry #t, the start point of the KPU can be located with respect to the presentation start time. It should be noted that the top address of the KPU as specified by the TimeEntry #t can be figured out by calculating the sum of the value of the ClipTimeLineAddressOffset field 95d and the value of the KPUEntryStartAddress field 97b of the TimeEntry #t.

In the foregoing description, a closed GOP structure (in which every picture in a GOP refers to only picture(s) within the same GOP) is supposed to be adopted for the sake of simplicity. However, if the closed GOP structure cannot be adopted or guaranteed, decoding may be started from a KPU that precedes the KPU including the specified presentation start time.

The media control section 205 reads the flag in the KPUEntry of the key picture unit KPU in the next processing step S174 and then determines, in Step S175, whether or not the value of the OverlappedKPUFlag field 98a is 1b. The value "1b" means that the key picture unit KPU covers both the first and second removable HDDs and the process advances to Step S176 in that case. On the other hand, if the value is 0b, the key picture unit KPU does not cover the two HDDs and the process advances to Step S177.

In Step S176, the media control section 205 reads data from the first picture of the KPU that is stored on the first removable HDD. When the TS processing section 204 removes the TTS header, the decoder 206 starts decoding with that data. In this case, according to the picture specified, the data may be stored on the second removable HDD, not on the first removable HDD on which the data stated to be read. To decode the data properly, decoding is started with the first key picture of the KPU that covers the two clips (or TTS files).

In Step S177, the media control section 205 reads data from the first picture of the KPU. When the TS processing section 204 removes the TTS header, the decoder 206 starts decoding with that data. The data of every picture to be read is stored within the same removable HDD.

Thereafter, in Step S178, after the picture associated with the presentation start time has been decoded, the graphic control section 207 starts outputting from that picture. If there is accompanied audio, the loudspeaker 209b also starts outputting it. After that, the content continues to be played back either through the end of the content or until an instruction to end playback is given. Then, the process ends.

Next, the processing of editing the content that has been recorded on a removable HDD will be described with reference to FIGS. 18 and 19. In the following example, this processing is supposed to be performed by the camcorder 100, too. Alternatively, this processing may also be performed by the PC 108 (see FIG. 1) loaded with the removable HDD on which the content has been recorded.

Portions (a) and (b) of FIG. 18 show how the relation between the management information and the clip AV stream changes before and after a top portion of the TTS file has been deleted by editing. The range D shown in portion (a) of FIG. 18 is the portion to be deleted. This range D includes the top portion of the TTS file, the address of which is supposed to be p1 and p1+D=p4 is supposed to be satisfied. As described above, the clip AV stream is sometimes stored after having been split into multiple files. The following processing applies to deleting a top portion and other portions of each TTS file.

Portion (b) of FIG. 18 shows the relation between the management information (ClipTimeLine) and the clip AV stream after the range D has been deleted. In this preferred embodiment, not all of the range D but only a part of the range D, the data size of which is n times as large as 96 kilobytes (where n is an integer), is deleted. Supposing the top data location after the deletion has an address p2, (p2−p1) should be (96 kilobytes)·n and p2≤p4 should be satisfied.

The terminal address p4 of the range D described above indicates the user's editing point. In other words, this terminal address p4 indicates the start point of the succeeding stream for the user. The value of the address p4 is represented as (p1+D). Alternatively, the address may also be represented by using the presentation start time information (e.g., the PTS) of the picture specified by that address. For example, if the user is editing with the address p4 set as a start point and with a subsequent address set as an end point, the end point may be set in accordance with not only the presentation start time information of the picture specified by the address p4 but also the video playback duration from p4 and the video presentation end time information, which is similar to the start time information. Those pieces of information indicating the user's editing interval (i.e., the start point and the end point) are managed in ClipMetaData 94 or Clip Time Line 95 shown in FIG. 9, for example.

By retaining the value of the address p4 or the time information associated with that address, playback, editing or any other operation may be started after the user's specified range D. Particularly, according to the processing method of this preferred embodiment, the data between p2 and p4 may be left in a readable state in the user's specified deletion range D. However, the user believes that the data between p2 and p4 has already been deleted, and therefore, would feel uncomfortable if the data were presented. Thus, by retaining the value of the address p4, it is possible to prevent the video between p2 and p4 from being played back or some point in that interval from being recognized as an editing start point erroneously. The value of the address p4 or the time information associated with the address is stored as playback information in the descriptive data of the clip meta-data 94 shown in FIG. 10.

96 kilobytes is the least common multiple of a cluster size of 32 kilobytes and a TTS packet size of 192 bytes as adopted in this preferred embodiment. This unit is adopted for the following reasons. Specifically, if the unit is an integral number of times as large as the cluster size, the data deletion processing on the removable HDD can be carried out on an access unit basis. Also, if the unit is an integral number of times as large as the TTS packet size, the data deletion processing can be carried out on the basis of TTS packets of the clip AV stream. As a result, the processing can get done more quickly and more easily. As the cluster size is 32 kilobytes according to this preferred embodiment, the deletion unit is supposed to be a multiple of 96 kilobytes. However, this value is changeable with the cluster size and the packet size of the clip AV stream adopted.

In the deletion processing, the values of the ClipTimeLineTimeOffset field 95c and the ClipTimeLine AddressOffset field 95d are also changed. These values are zero before the deletion. After the deletion, first, the data size through the key picture unit KPU that appears for the first time is described in the ClipTimeLineAddressOffset field 95d. Supposing the address at which the first key picture unit KPU is stored is p3, a value (p3−p2) is described in the ClipTimeLineAddressOffset field 95d. Also, the time difference between the presentation time of the first key picture and the first time entry in the first key picture unit KPU is described on an AUTM basis on the ClipTimeLineTimeOffset field 95c. There is no guarantee that the packets of the clip AV stream between the addresses p2 and p3 can be decoded by themselves. That is why those packets are treated as a fragment and not supposed to be played back.

FIG. 19 shows the procedure of content partial deletion processing to be done by the camcorder 100. First, in Step S191, the CPU 211 of the camcorder 100 receives a user's instruction to partially delete a TTS file and his or her specified deletion range D by way of the instruction receiving section 215. As used herein, the "instruction to partially delete" is an instruction to delete the top portion and/or the end portion of a TTS file. According to the contents of the instruction, "front portion deletion processing" to delete the top portion or "rear portion deletion processing" to delete the end portion is carried out.

In Step S192, it is determined whether or not this is the front portion deletion processing. If the answer is YES, the process advances to Step S193. Otherwise, the process advances to Step S195. In Step S193, the media control section 205 deletes an amount of data, which is an integral multiple of 96 kilobytes, from the data size D corresponding to the deletion range. Then, in Step S194, the media control section 205 modifies the time offset value for the first time entry (i.e., the value of the ClipTimeLineTimeOffset field 95c) and the address offset value for the first KPU entry (i.e., the value of the ClipTimeLineAddressOffset field 95d) in the time-address conversion table (ClipTimeLine). After that, the process advances to Step S195.

In Step S195, it is determined whether or not this is the rear portion deletion processing. If the answer is YES, the process advances to Step S196. Otherwise, the process advances to Step S197. In Step S196, an amount of data corresponding to the deletion range is deleted on a 192 byte basis such that the end of the TTS file becomes a perfect KPU, which means that an amount of data that is an integral multiple of 192 bytes is deleted. After that, the process advances to Step S197.

In Step S197, the number of time entries and the number of KPU entries that have changed as a result of the partial deletion processing are modified. More specifically, the KPUEntry that has no real data anymore and the TimeEntry that has lost the KPUEntry referred to by the KPUEntryReferenceID are deleted from the time-address conversion table (ClipTimeLine). Also, the values of the TimeEntryNumber field 95a, the KPUEntryNumber field 95b and so on are modified.

It should be noted that even if neither the front portion deletion processing nor the rear portion deletion processing is carried out, the process also goes through Step S197. This means the modification processing is also supposed to be performed even if an intermediate portion of a TTS file has been deleted, for example. However, such intermediate portion deletion processing will not be mentioned particularly herein.

The partial deletion processing does not have to be performed on a top portion of a TTS file as described above but may also be performed on a range including an end portion of the TTS file. The latter type of processing may be applied to deleting the imperfect key picture unit KPU (i.e., KPU #d1 shown in FIG. 14) described above. The imperfect key picture unit KPU is located at the end of one clip, which falls within the "range including an end portion of a TTS file". In this case, the range to be deleted is from the top of the imperfect key picture unit KPU through the end of the TTS file. The deletion range may be determined on a TTS packet size basis (a 192 byte basis), for example. There is no special need to consider the cluster size. It should be noted that the end portion of a TTS file does not have to be the imperfect key picture unit KPU but may be arbitrarily determined as the user's specified range, for example. The top portion deletion processing and the end portion deletion processing may be carried out back to back or only one of the two types of processing may be carried out selectively.

Preferred embodiments of the present invention are as described above.

In the preferred embodiments described above, the media to store a data stream is supposed to be removable HDDs. However, as long as the media can manage files by the file system described above, the media may also be non-removable ones such as HDDs built in data processors.

The data structure of the time map (ClipTimeLine) is supposed to include the two layers of TimeEntries and KPUEntries. However, as long as the presentation times are convertible into storage addresses, and vice versa, the data structure does not have to have the two layers but quite the same statement applies to even a time map consisting of the KPUEntry layer alone. Also, in the foregoing description, the OverlappedKPUFlag field is provided and it is determined by the value of that field whether or not a key picture unit KPU covers multiple files. However, even if there is no data corresponding to the time map, it may be determined whether multiple files are covered or not. For example, it may be indicated that the KPU (may) cover multiple files by storing clip meta-data (such as the relation information), the clip file naming rule (such as file name numbers in the ascending order) or all data of one shot within the same folder (at least some of the TTS files for one shot that are stored on the same storage medium).

The respective functional blocks such as those shown in FIG. 2, for example, are typically implemented as an LSI (large-scale integrated circuit) chip. These functional blocks may be implemented as respective chips or may also be integrated together into a single chip either fully or just partially. In FIG. 2, for example, the system control section 250 including the CPU 211 and the media control section 205 are shown as mutually different functional blocks. However, these blocks may be implemented either as two different semiconductor chips or as physically the same chip by incorporating the functions of the media control section 205 into the system control section 205. Optionally, the functions of the media control section 205 and TS processing section 204 may be integrated together into a single chip circuit. Or a chip circuit 217 may be realized by further adding the functions of the encoder 203 and the decoder 206 thereto. However, only the memory that stores the data to be encoded or decoded may be excluded from the blocks to be integrated together. Then, a number of coding methods can be coped with easily.

The system control section 250 can carry out the functions of the media control section 205 that have been described above by executing the computer program stored in the program ROM 210, for example. In that case, the media control section 205 is realized as one of multiple functions of the system control section 250.

It should be noted that the LSI mentioned above is sometimes called an IC, a system LSI, a super LSI or an ultra LSI depending on the number of devices that are integrated together per unit area. The integrated circuit does not have to be an LSI but may also be implemented as a dedicated circuit or a general-purpose processor. Optionally, after an LSI has been fabricated, a programmable FPGA (field programmable gate array) or a reconfigurable processor in which the connection or setting of circuit cells inside the LSI are changeable may be adopted.

As another possibility, a novel integrated circuit technology to replace LSIs might be developed in the near future as a result of advancement of the semiconductor technology or any other related technology. In that case, the functional blocks could be integrated together by that novel technology. For example, the functional blocks could be integrated together as so-called "bio elements" by utilizing some biotechnology.

INDUSTRIAL APPLICABILITY

According to the present invention, a data structure that supposes to store a content data stream on multiple files to record the content can be obtained. According to this data structure, the device can easily access data in any file and start presenting the data. In addition, by further editing the file using this data structure, the device can get the processing done more quickly with the processing load lightened.

What is claimed is:

1. A data processor for editing a content that has been written on a medium,
the content being stored in a file as a data stream including multiple packets of the same packet size,
the data processor comprising:
a receiving section, configured to receive an instruction on a partial deletion range including the end of the file; and
a media control section configured to determine data within the partial deletion range on a packet size basis, and to delete the data from the end of the file; wherein:
the data stream in the file includes multiple key picture playback units, each of which has a first picture and at least one second picture to be decoded from the first picture, and
the media control section determines and deletes the data of an imperfect key picture playback unit located at the end of the data stream in the file on the packet size basis.

2. The data processor of claim 1, wherein the media control section determines and deletes the data from the top of an imperfect key picture playback unit through the end of the file on the packet size basis.

3. The data processor of claim 2, wherein address information has been written on the medium, the address information specifying a start position of each of the multiple playback units included in the data stream in the file, and
wherein the media control section specifies the start position of the imperfect key picture playback unit based on the address information.

4. The data processor of claim 1, wherein the data stream is made up of multiple packets, each having a packet size of 192 bytes, and
wherein the media control section deletes data, the size of which is an integral multiple of 192 bytes.

5. The data processor of claim 1, wherein a file system for accessing data on a cluster size basis having been established on the medium,
wherein the media control section deletes data on a predetermined data unit basis that is different from the cluster size basis.

6. The data processor of claim 5, wherein the media control section deletes the data on the predetermined data unit basis, and
wherein a size of the predetermined data unit is smaller than the cluster size.

* * * * *